(12) United States Patent
Shoda et al.

(10) Patent No.: US 11,529,864 B2
(45) Date of Patent: Dec. 20, 2022

(54) DRIVE DEVICE FOR ELECTRIC VEHICLE AND ELECTRIC VEHICLE

(71) Applicant: MITSUBISHI HEAVY INDUSTRIES, LTD., Tokyo (JP)

(72) Inventors: Katsuhiko Shoda, Tokyo (JP); Kensuke Nishiura, Tokyo (JP); Kazuma Otaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 203 days.

(21) Appl. No.: 17/077,264

(22) Filed: Oct. 22, 2020

(65) Prior Publication Data

US 2021/0162856 A1 Jun. 3, 2021

(30) Foreign Application Priority Data

Nov. 29, 2019 (JP) .............................. JP2019-216643
Mar. 31, 2020 (JP) .............................. JP2020-063312

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/046* (2013.01); *B60K 17/08* (2013.01);
(Continued)

(58) Field of Classification Search
CPC .... B60K 7/0007; B60K 17/046; B60K 17/08; B60K 2007/0038; F16H 1/28; F16H 57/02
(Continued)

(56) References Cited

U.S. PATENT DOCUMENTS 7,886,858 B2 * 2/2011 Ai .......................... F16H 1/2818
180/65.6
9,180,771 B2 * 11/2015 Yukishima ........... B60K 17/145
(Continued)

FOREIGN PATENT DOCUMENTS

EP 2 567 849 3/2013
EP 2 568 199 3/2013
(Continued)

OTHER PUBLICATIONS

The extended European Search Report dated Apr. 23, 2021 in corresponding EP Application No. 20206888.8.

*Primary Examiner* — Hau V Phan
(74) *Attorney, Agent, or Firm* — Wenderoth, Lind & Ponack, L.L.P.

(57) ABSTRACT

A drive device for an electric vehicle includes: a motor configured to be in a drive wheel of the electric wheel; and a reduction gear configured to reduce rotational speed of the motor and transmit resultant rotation to the drive wheel; the reduction gear including a sun gear configured to be driven by the motor, a first planetary gear that is configured to mesh with the sun gear and has a first number of teeth, a fixed ring gear that is meshed with the first planetary gear and arranged non-rotatably, a second planetary gear that is coupled to the first planetary gear and has a second number of teeth that is smaller than the first number of teeth, a movable ring gear that is meshed with the second planetary gear and arranged rotatably, and a transmission member configured to transmit rotation of the movable ring gear to the drive wheel.

14 Claims, 11 Drawing Sheets

(51) Int. Cl.
  *B60K 17/08* (2006.01)
  *F16H 1/28* (2006.01)
  *F16H 57/02* (2012.01)

(52) U.S. Cl.
  CPC ............... *F16H 1/28* (2013.01); *F16H 57/02* (2013.01); *B60K 2007/0038* (2013.01); *B60K 2007/0092* (2013.01); *F16H 2057/02034* (2013.01); *F16H 2057/02052* (2013.01)

(58) Field of Classification Search
  USPC .......................................................... 180/55
  See application file for complete search history.

(56) References Cited

U.S. PATENT DOCUMENTS

| | | | |
|---|---|---|---|
| 9,302,734 B2* | 4/2016 | Getta | B62M 11/14 |
| 9,729,026 B2* | 8/2017 | Makino | B60K 7/0007 |
| 9,758,213 B2* | 9/2017 | Kawakami | B62M 9/12 |
| 9,945,454 B2* | 4/2018 | Liang | F16H 3/72 |
| 10,060,509 B2* | 8/2018 | Liang | H02K 7/08 |
| 2008/0169141 A1* | 7/2008 | Suzuki | H02K 7/085 |
| | | | 180/65.7 |
| 2011/0133541 A1* | 6/2011 | Makino | F16H 1/32 |
| | | | 301/6.5 |
| 2013/0012350 A1* | 1/2013 | Ebner | B60K 7/0007 |
| | | | 475/149 |
| 2013/0153338 A1* | 6/2013 | Yamauchi | F01M 1/02 |
| | | | 184/26 |
| 2013/0292993 A1 | 11/2013 | Yukishima et al. | |
| 2014/0041619 A1* | 2/2014 | Yamauchi | F16H 57/0006 |
| | | | 123/196 R |
| 2019/0005749 A1* | 1/2019 | Hong | G07C 5/0833 |

FOREIGN PATENT DOCUMENTS

| | | |
|---|---|---|
| JP | 05-054042 | 7/1993 |
| JP | 2019-172194 | 10/2019 |

* cited by examiner

DRIVE DEVICE FOR ELECTRIC VEHICLE AND ELECTRIC VEHICLE

CROSS-REFERENCE TO RELATED APPLICATIONS

This application claims the benefit of priority to the Japanese Patent Application Numbers 2019-216643 and 2020-063312, filed on Nov. 29, 2019 and Mar. 31, 2020, respectively. The entire contents of each of the above-identified applications are hereby incorporated by reference.

TECHNICAL FIELD

The present disclosure relates to a drive device (drive system) for an electric vehicle such as a vehicle of a new traffic system or an electric car, for example.

RELATED ART

A drive device currently used for a vehicle (new traffic vehicle) for a new traffic system has a configuration in which power from a large variable speed motor (electric motor) is distributed to left and right axles using a differential gear via a large hypoid gear (see FIGS. 7A and 7B). More specifically, the variable-speed motor is attached to the differential gear via a coupling. In this configuration, the rotation direction of the variable speed motor is different from the rotation direction of the axles, and thus the variable speed motor and the differential gear are connected to each other with the rotation direction of the variable speed motor converted into the rotation direction of the axle by the large hypoid gear. The axle is coupled to the drive wheel by being splined to a tire shaft bolted onto a wheel (disk portion) of a drive wheel or by the other like means. Thus, the rotation of the axle is transmitted to the drive wheel.

Meanwhile, a drive device for an electric car is known, which has driving force of an electric motor distributed to left and right axles by a differential gear via two-stage parallel gears. JP 2019-172194 A discloses a reduction gear with which rotation of a motor rotation shaft of an in-wheel motor drive device is transmitted to output gears, coaxially provided to the outer circumferential surface of an output shaft, by means of a plurality of intermediate gears. A drive wheel (wheel) is driven with an inner wheel of a wheel hub bearing portion, coupled to the wheel, rotating at the same rotational speed as the output shaft. JP 05-54042 UM-A discloses a configuration of a device that drives a drive wheel (steering wheel) with a hydraulic motor. In this configuration, the drive wheel is driven via a composite planetary gear train (reduction gear).

SUMMARY

While an electric motor (power source) of a new traffic system constantly receives power supply from a power cable (overhead wiring) (see FIGS. 7A and 7B), systems that can be driven without the overhead (with batteries) have been under study for achieving a more cost competitive new traffic system. In such systems without overhead wiring, the battery on a carriage is charged only while the vehicle is parked at a station. Unfortunately, with the configuration of the current drive device, a variable-speed motor largely takes up the space on the carriage, and thus there is a problem in that an enough space for the battery cannot be guaranteed on the carriage.

In view of the above, an object of at least one embodiment of the present invention is to provide a drive device enabling enough space for installing a battery and the like to be secured in an electric vehicle.

A drive device for an electric vehicle according to at least one embodiment of the present invention includes:
an in-wheel motor; and
a reduction gear that reduces rotational speed of the in-wheel motor and transmits resultant rotation to a drive wheel of the electric vehicle,
the reduction gear including:
  a sun gear driven by the in-wheel motor;
  a first planetary gear that is arranged to be meshed with the sun gear and has a first number of teeth;
  a fixed ring gear that is meshed with the first planetary gear and arranged non-rotatably;
  a second planetary gear that is coupled to the first planetary gear and has a second number of teeth that is smaller than the first number of teeth;
  a movable ring gear that is meshed with the second planetary gear and arranged rotatably; and
  a transmission member that transmits rotation of the movable ring gear to the drive wheel.

An electric vehicle according to at least one embodiment of the present invention includes the drive device for an electric vehicle described above.

At least one embodiment of the present invention provides a drive device enabling enough space for installing a battery and the like to be secured in an electric vehicle.

BRIEF DESCRIPTION OF DRAWINGS

The disclosure will be described with reference to the accompanying drawings, wherein like numbers reference like elements.

DESCRIPTION OF EMBODIMENTS

An embodiment of the present invention will be described hereinafter with reference to the appended drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
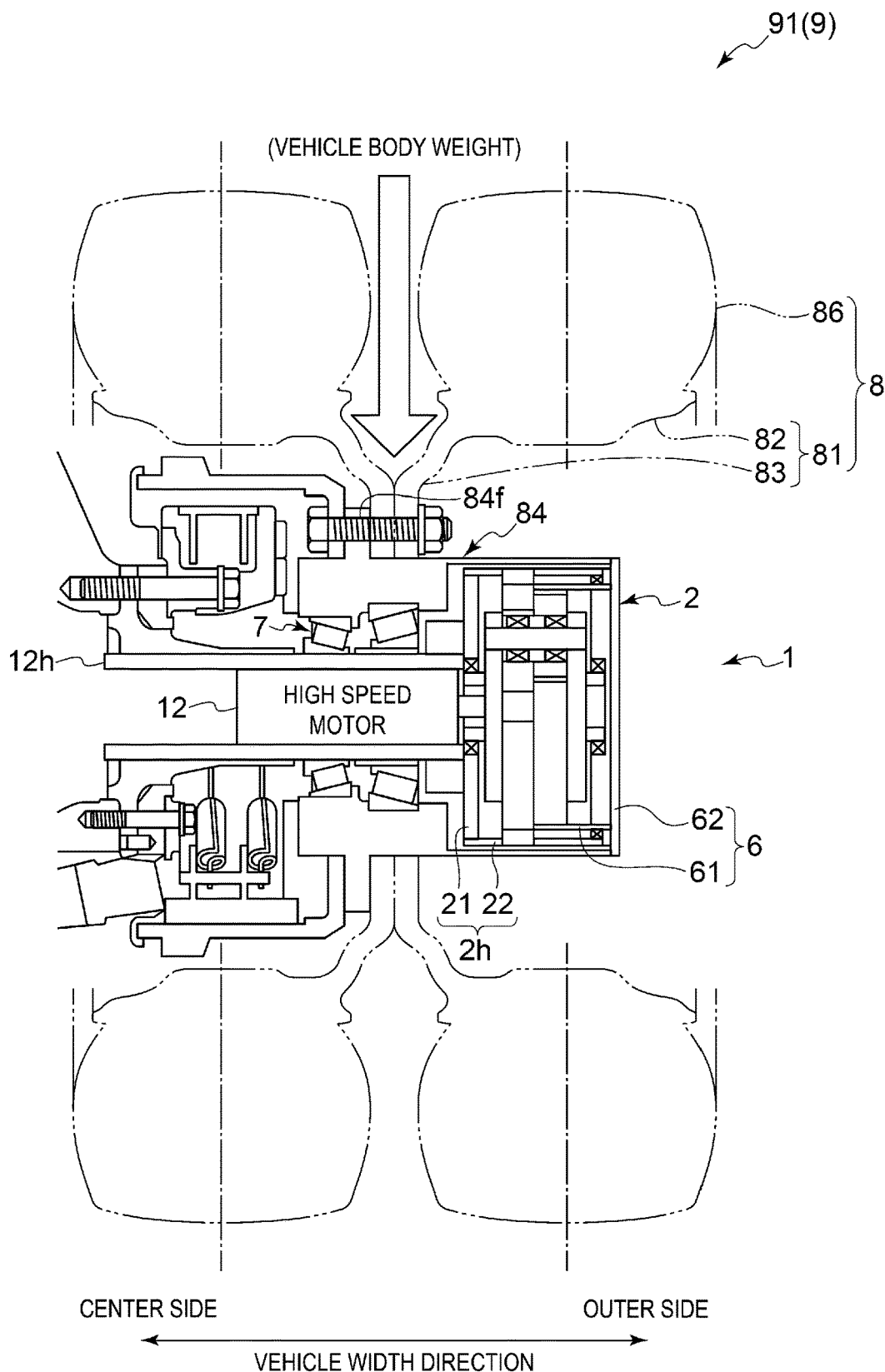
FIG. 1 is a diagram schematically illustrating a configuration of a drive device of an electric vehicle according to an embodiment of the present invention which is a new traffic vehicle.
Figure 2:
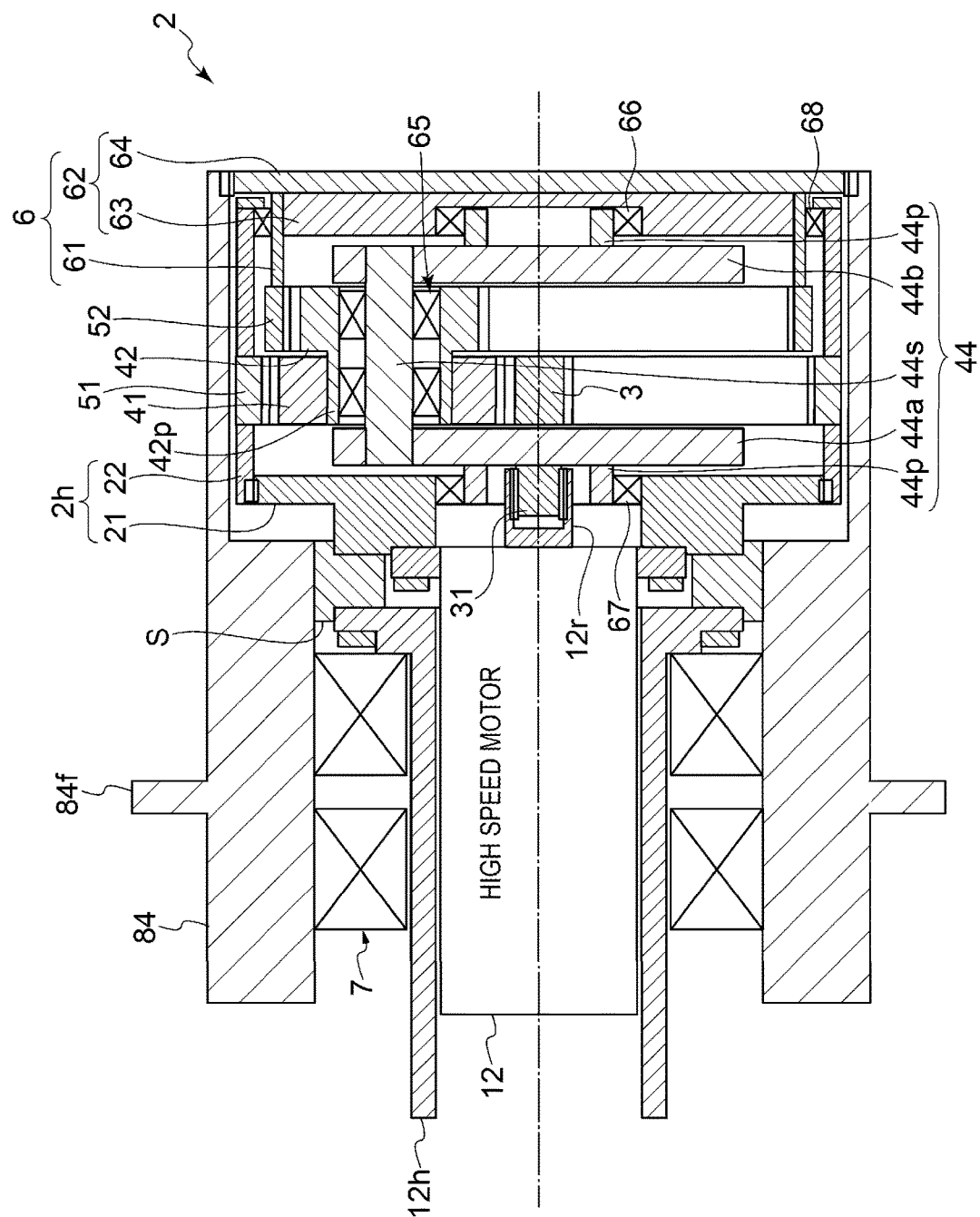
FIG. 2 is a cross-sectional view of a reduction gear according to an embodiment of the present invention.
Figure 3:
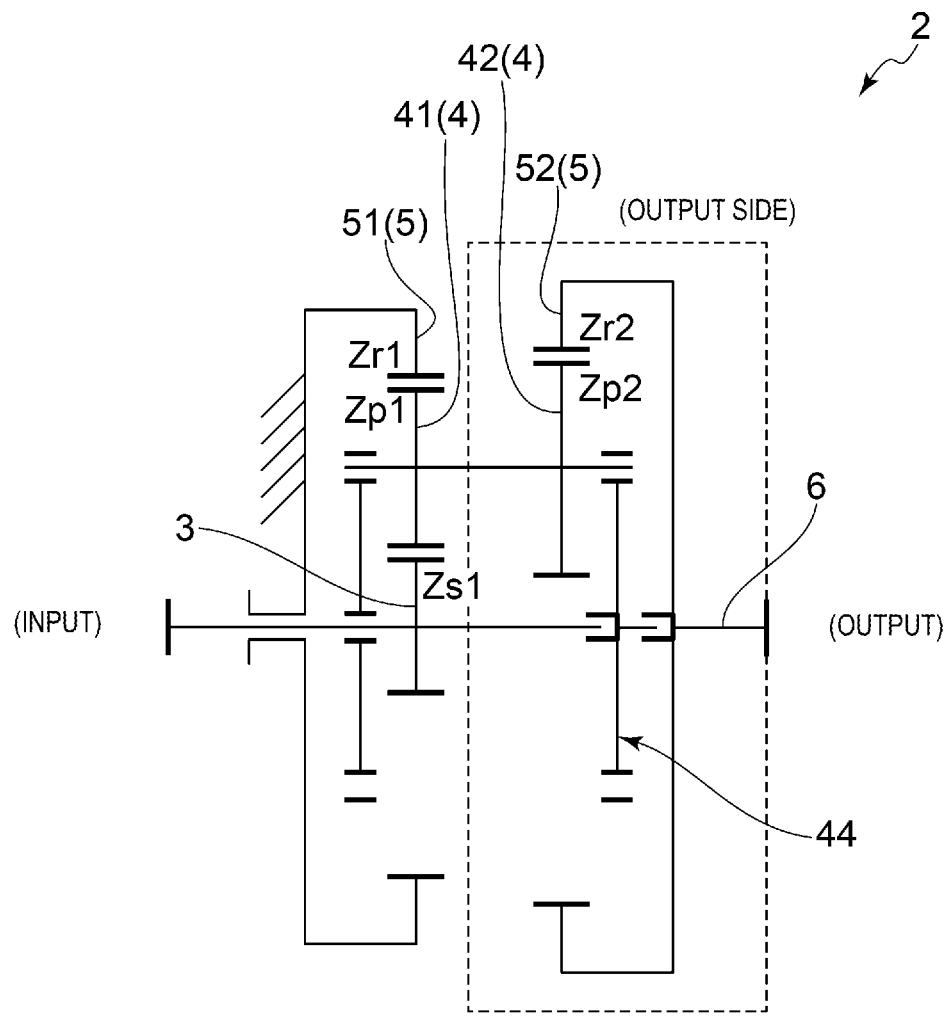
FIG. 3 is a diagram schematically illustrating a configuration of the reduction gear illustrated in FIG. 2.
Figure 4:
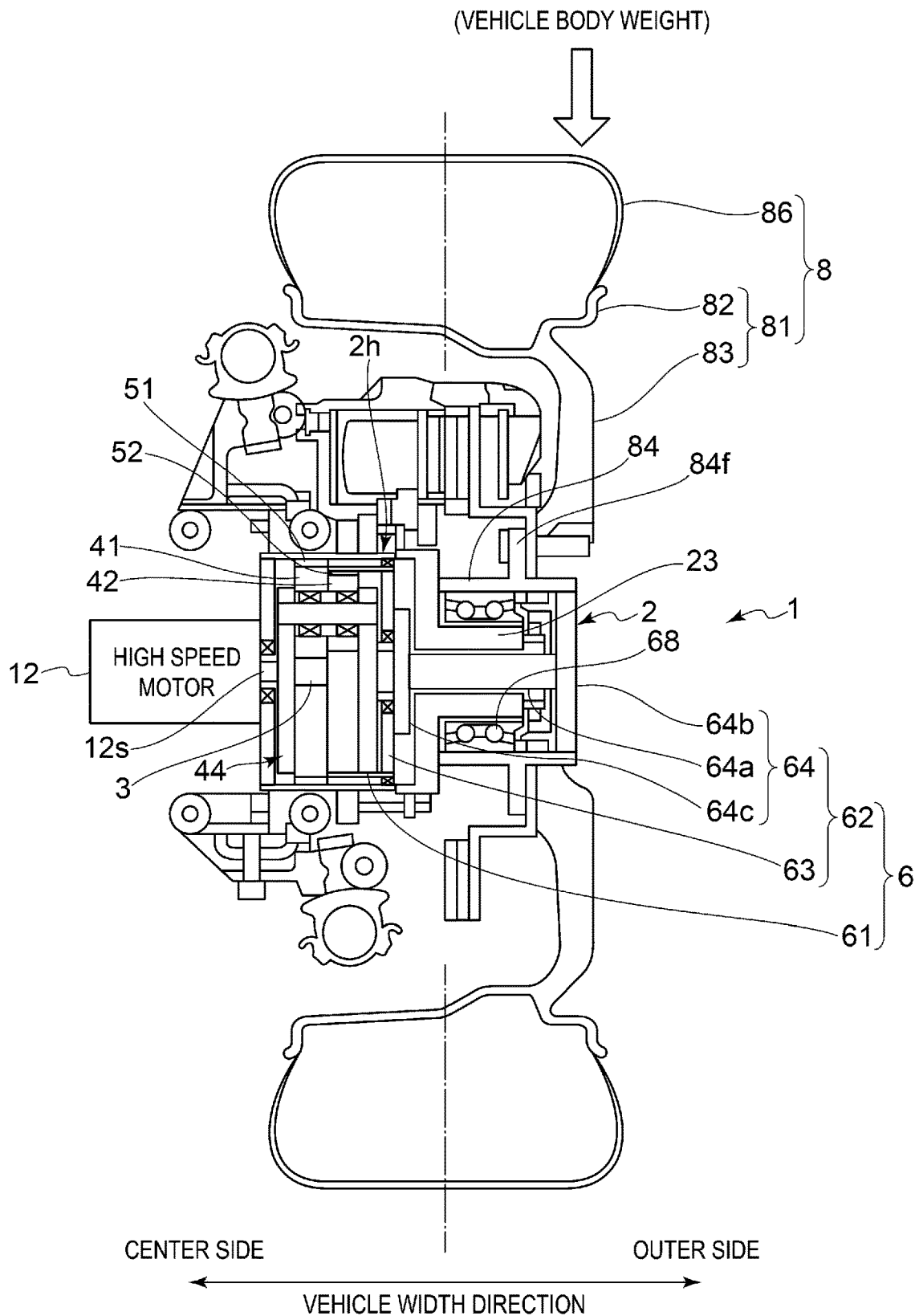
FIG. 4 is a diagram schematically illustrating a configuration of a drive device of an electric vehicle according to an embodiment of the present invention which is an electric car.
Figure 5:
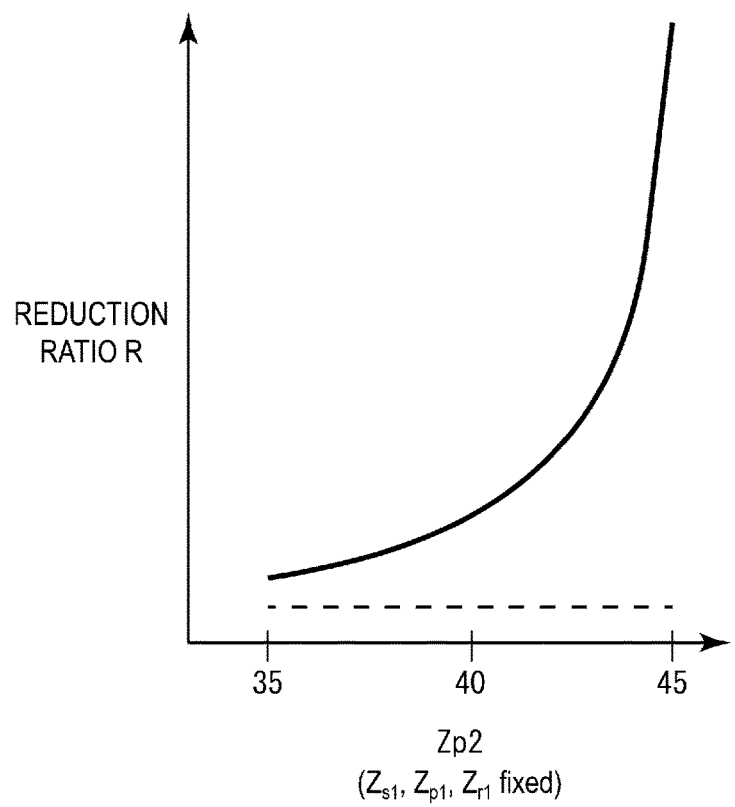
FIG. 5 is a graph illustrating a reduction ratio for a second planetary gear of the reduction gear according to an embodiment of the present invention.
Figure 6A:
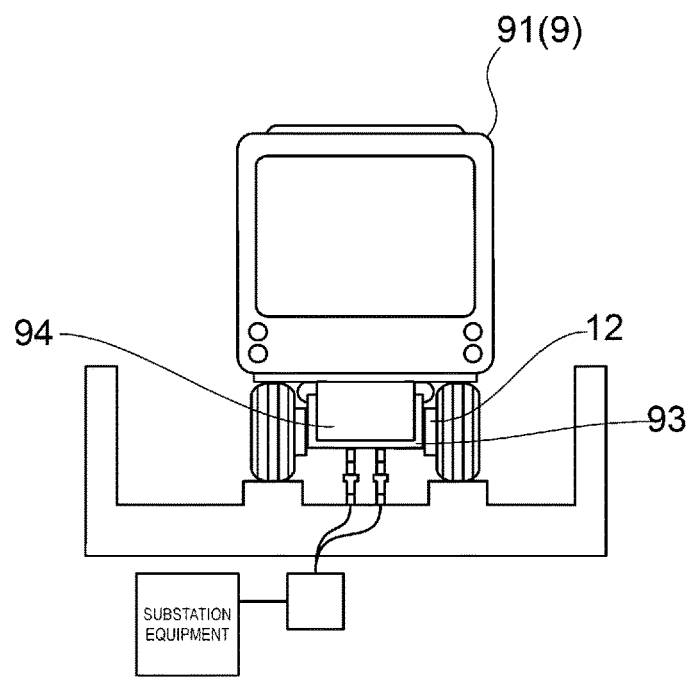
FIG. 6A is a diagram illustrating a new traffic system according to an embodiment of the present invention, and is a schematic front view of the new traffic vehicle.
Figure 6B:
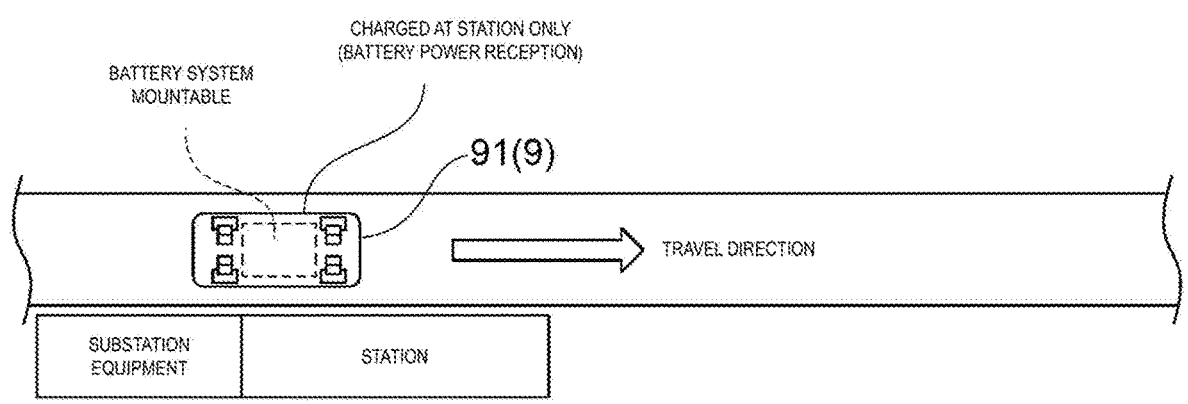
FIG. 6B is a diagram illustrating the new traffic system according to an embodiment of the present invention, and is a bird's eye view illustrating the new traffic vehicle illustrated in FIG. 6A together with a traveling path.

FIG. 1 is a diagram schematically illustrating a configuration of a drive device 1 of an electric vehicle 9 according to an embodiment of the present invention which is a new traffic vehicle 91. FIG. 2 is a cross-sectional view of a reduction gear 2 according to an embodiment of the present invention. FIG. 3 is a diagram schematically illustrating a configuration of the reduction gear 2 illustrated in FIG. 2. FIG. 4 is a diagram schematically illustrating a configuration of the drive device 1 of an electric vehicle 9 according to an embodiment of the present invention which is an electric car. FIG. 5 is a graph illustrating a reduction ratio of the reduction gear 2 for the second planetary gear 42 according to an embodiment of the present invention. FIG. 6A is a diagram illustrating a new traffic system according to an embodiment of the present invention, and is a schematic front view of a new traffic vehicle 91. FIG. 6B is a diagram illustrating the new traffic system according to an embodiment of the present invention, and is a bird's eye view illustrating the new traffic vehicle 91 illustrated in FIG. 6A together with a traveling path.

As illustrated in FIGS. 1 and 4, the drive device 1 of the electric vehicle 9 (hereinafter simply referred to as "drive device 1") includes an in-wheel motor 12 and a reduction gear 2 that is connected to a rotation shaft 12r of the in-wheel motor 12, and reduces the rotational speed of the rotation shaft 12r and outputs the resultant rotation to a drive wheel 8. The in-wheel motor 12 and the reduction gear 2 are each provided for each of a plurality of the drive wheels 8 of the electric vehicle 9. The drive device 1 drives (rotates) the drive wheels 8 by increasing the driving torque (force) with the reduction gear 2 reducing the rotational speed of the in-wheel motor 12 by a predetermined reduction ratio R.

The above-described in-wheel motor 12 is a small, high-speed rotatable electric motor, for example, and is installed at a position adjacent to the drive wheel 8 as illustrated in FIGS. 1 and 4. Specifically, as illustrated in FIG. 1, the in-wheel motor 12 may be installed to have at least a portion thereof located in a wheel space V (described later) of each drive wheel 8 for example. In the embodiment illustrated in FIG. 1, the in-wheel motor 12 is disposed in the wheel spaces V (described later) that are formed on vehicle center side and a vehicle outer side in the vehicle width direction relative to a disk portion 83 (described later). Alternatively, the in-wheel motor 12 may be positioned so as not to overlap with the wheel space V. In the embodiment illustrated in FIG. 4, the in-wheel motor 12 is disposed to be position more toward the vehicle center side than the wheel space V (described later) formed more toward the vehicle center side in the vehicle width direction than the disk portion 83 (described later).

The wheel space V described above is a space defined by a rim portion 82 and the disk portion 83 that form a wheel 81. Specifically, as illustrated in FIGS. 1 and 4, each drive wheel 8 includes the wheel 81 that is coupled to an output side of the reduction gear 2 (a transmission member 6 described later), and a tire 86 made of rubber or the like for example and mounted on the wheel 81. The wheel 81 includes the rim portion 82 described above on which the tire 86 is mounted, and the disk portion 83 described above coupled to the output side of the reduction gear 2. The wheel space V is defined by the rim portion 82 and the disk portion 83.

However, the present invention is not limited to the embodiments illustrated in FIGS. 1 and 4. For example, in some other embodiments, the in-wheel motor 12 may be installed to have a portion thereof located only on the vehicle center side in the vehicle width direction relative to the disk portion 83. Alternatively, the in-wheel motor 12 may be installed to have a large portion (for example, the entirety) thereof located in the wheel space V on the vehicle outer side in the vehicle width direction relative to the disk portion 83.

The drive wheel 8 is coupled to the output side of the reduction gear 2 directly or with another member provided in between to receive the output from the reduction gear 2. For example, as illustrated in FIGS. 1 and 4, the drive wheel 8 and the reduction gear 2 may be coupled to each other using a tire shaft 84 having a tubular shape (for example, a cylindrical shape, the same applied in the following) for coupling the disk portion 83 and the output side of the reduction gear 2. In the embodiments illustrated in FIGS. 1 and 4, a through hole for installing (inserting) the tire shaft 84 described above is formed in the center (rotation center) of the disk portion 83. Then, the disk portion 83 and the output side of the reduction gear 2 are coupled to each other by the tire shaft 84 installed in the through hole.

More specifically, a flange 84f is formed on the outer circumferential surface of the tire shaft 84. Through holes (bolt holes) for inserting bolts are formed in a plurality of portions of the flange 84 and of a circumferential edge portion of the through hole of the disk portion 83. The bolts inserted in the bolt holes of the flange 84f and the disk portion 83 aligned are fastened by nuts, whereby the disk portion 83 and the tire shaft 84 are coupled to each other by bolting.

Note that in the present specification, the term couple indicates that two portions (members) are integrated in such a manner that rotation of one of the members results in the integrated rotation (driven rotation) of the other member. Specifically, the two portions may be integrated using a fastening member such as a bolt or may be integrated by fitting by splining (spline coupling). The two portions may be integrated by welding, adhesive bonding, or may be manufactured as an integrated part by molding, three-dimensional manufacturing, or the like.

Configuration of Reduction Gear 2

Next, the configuration of the above-described reduction gear 2 will be described in detail using FIGS. 2 and 3.

Note that the reduction gears 2 illustrated in FIGS. 1 and 4 have substantially the same mechanism (configuration) except for the shape of the transmission member 6 described later. Thus, the configuration of the speed reduction gear 2 common to both FIGS. 1 and 4 will be described using FIG. 2, which is an enlarged view of the reduction gear 2 in FIG. 1. As described above, the reduction gears 2 in FIGS. 1 and 4 have substantially the same mechanism, and thus the common configuration of the reduction gear 2 illustrated in FIG. 3 not only applies to the reduction gear 2 in FIG. 1 but also applies to the reduction gear 2 in FIG. 4.

As illustrated in FIGS. 2 and 3, the reduction gear 2 includes a sun gear 3, two types of planetary gears 4 (a first planetary gear 41 and a second planetary gear 42), two types of ring gears 5 (a fixed ring gear 51 and a movable ring gear 52), and the transmission member 6 for transmitting rotation of one of the ring gears 5 (movable ring gear 52) on a later stage to the drive wheel 8. These gears are housed in a reduction gear housing 2h and are coupled to each other by meshing or the like to be interlocked, as will be described later.

The configuration of each of these will be described.

The sun gear 3 is a gear driven by the in-wheel motor 12. Specifically, the gear is configured to be coupled to the rotation shaft 12r of the in-wheel motor 12 directly or with another member provided in between, to rotate together with the rotation shaft 12r of the in-wheel motor 12 in a coaxial manner or the like for example. The sun gear 3 is an external gear, and is configured to be meshed with the first planetary gear 41 that is also an external gear, to rotate the first planetary gear 41.

The first planetary gear 41 is a gear arranged to mesh with the sun gear 3 described above. Generally, a plurality of the first planetary gears 41 are positioned around the sun gear 3 at an equal interval, for example, by a carrier member 44 (described later). The first planetary gears 41 are external gears, and all of the first planetary gears 41 mesh with the fixed ring gear 51 disposed on the outer circumferential side thereof.

The fixed ring gear 51 is a gear disposed in a state of meshing with the first planetary gear 41. The fixed ring gear 51 is an internal gear having an annular shape, and does not rotate relative to the reduction gear housing 2h, by being fixed to the reduction gear housing 2h or by other means. Thus, when the sun gear 3 rotates, the first planetary gears 41 revolve around the sun gear 3 in the same direction as the rotation direction of the sun gear 3, while rotating in a direction opposite to the rotation direction of the sun gear 3.

Furthermore, the second planetary gear 42 is a gear that is coupled to the above-described first planetary gear 41 and is configured to coaxially rotate in the same direction with the first planetary gear 41. The second planetary gear 42 is provided for each of the first planetary gears 41, and thus the number of the second planetary gears 42 is the same as the number of the first planetary gears 41. The second planetary gears 42 are external gears, and all of the second planetary gears 42 mesh with the movable ring gear 52 disposed on the outer circumferential side thereof.

The movable ring gear 52 is a gear arranged to mesh with the second planetary gears 42, which are present in the same number as the first planetary gears 41. The movable ring gear 52 is an internal gear having an annular shape. Unlike the fixed ring gear 51 described above, the movable ring gear 52 is not fixed to the reduction gear housing 2h or the like. That is, the movable ring gear 52 is rotatably disposed. Thus, rotation of the second planetary gears 42 results in the rotation of the movable ring gear 52 in the same direction.

The transmission member 6 is coupled to the movable ring gear 52 so as to integrally rotate with the movable ring gear 52. Thus, the transmission member 6 serves as an output shaft of the reduction gear 2. Specifically, the transmission member 6 includes a ring side coupling portion 61 having a tubular shape for example that is coupled to the movable ring gear 52, and a drive wheel side coupling portion 62 that has a plate (disk) shape and is provided to close the other end side of the ring side coupling portion 61 (see FIGS. 1 and 4). The drive wheel side coupling portion 62 is coupled to the disk portion 83 of the wheel 81 directly or with another member (the tire shaft 84 in the present embodiment) provided in between. The detailed configuration of the transmission member 6 will be described later.

A planetary gear device having a general configuration includes: a sun gear 3, which is an external gear; planetary gears 4 (corresponding to the first planetary gear 41 according to the present embodiment), which are a plurality of (for example, three) external gears that each mesh with the external teeth of the sun gear 3; a ring gear 5 (an internal gear, corresponding to the fixed ring gear 51 according to the present embodiment) that accommodate the plurality of planetary gears 4 arranged around the sun gear 3 as described above and meshes with the plurality of planetary gears 4; and a carrier that is coupled to the ring gear 5 and serves as an output shaft.

On the other hand, the reduction gear 2 having the above-described configuration (see FIGS. 1 to 4) has a mechanism in which the ring gear 5, in the planetary gear device with the general configuration described above, divided in two, that is, into the fixed ring gear 51 and the movable ring gear 52 that are interlocked using two planetary gears, that is, the planetary gear 4 (the first planetary gear 41) and a newly introduced planetary gear 4 (the second planetary gear 42).

A first number of teeth $Z_{p1}$ which is the number of teeth of the first planetary gears 41 is larger than a second number of teeth $Z_{p2}$ which is the number of teeth of the second planetary gear 42 ($Z_{p1} > Z_{p2}$). Based on this, with the numbers of teeth of the fixed ring gear 51, the movable ring gear 52, and the sun gear 3 respectively defined as $Z_{r1}$, $Z_{r2}$, and $Z_{s1}$ (see FIG. 3), the configuration described above satisfies the relationship $R = (1 + Z_{r1}/Z_{s1})/\{1 - (Z_{r1} \times Z_{p2})/(Z_{p1} \times Z_{r2})\}$, regarding the reduction ratio R of the reduction gear 2.

For example, when $Z_{p1}$, $Z_{r1}$, $Z_{r2}$, and $Z_{s1}$ in this formula are fixed to any values, a graph as illustrated in FIG. 5 is obtained with the horizontal axis representing the second number of teeth $Z_{p2}$ and the vertical axis representing the reduction ratio R. As indicated by the solid line in FIG. 5, the reduction gear 2 with the desired reduction ratio R can be more easily implemented by changing the second number of teeth $Z_{p2}$ of the second planetary gear 42. Because the reduction ratio R can be changed by changing the second number of teeth $Z_{p2}$, the size (diameter) of the fixed ring gear 51 needs not to be changed, meaning that the reduction ratio R can be adjusted without changing the size of the reduction gear 2 (the reduction gear housing 2h). Furthermore, the reduction ratio R can be made larger than that achieved by a typical planetary gear device (indicated by the dashed line in FIG. 5).

The embodiment illustrated in FIG. 2 will be described more in detail. A through hole is formed in the center of the second planetary gear 42 described above. Furthermore, the second planetary gear 42 has a tubular coupling portion 42p formed to protrude from the circumferential edge of the through hole. Furthermore, the coupling portion 42p is disposed in a through hole formed in the center of the first planetary gear 41, whereby the planetary gears are splined to each other. Specifically, grooves formed at an equal interval in the outer circumferential surface of the coupling portion 42p described above and grooves formed at an equal interval in the inner circumferential surface of the through hole (boss) of the first planetary gear 41 fit with each other. This spline coupling enables relative displacement between the planetary gears to be absorbed.

A hole defined by the through hole of the first planetary gear 41, the through hole of the second planetary gear 42, and the inside of the coupling portion 42p is provided with first bearings 65 (two bearings in the present embodiment). The first bearings 65 are configured to rotatably support shaft portions 44s that rotate the carrier member 44. The shaft portions 44s of the carrier member 44 are portions that are provided in holes of the pair of planetary gears 4 (41 and 42). Both end portions of all of the shaft portions 44s are each coupled to a plate shaped coupling portion (a first coupling portion 44a and a second coupling portion 44b). Each of these two coupling portions has a disk shape for example, and has a tubular protruding portion 44p having the center matching the center (center of gravity) of the coupling portion.

The outer circumference of the protruding portion 44p of the coupling portion (second coupling portion 44b) located on the second planetary gear 42 side is supported by a second bearing 66 that is provided to the transmission member 6 (a thin portion formed at the center of the drive wheel side coupling portion 62). The outer circumference of the protruding portion 44p of the coupling portion (first coupling portion 44 a) located on the first planetary gear 41 side is supported by the reduction gear housing 2h via a third bearing 67. As a result, the carrier member 44 rotates together with the revolution of the first planetary gears 41. Note that a through hole is formed in the center of the second coupling portion 44b, and an input shaft 31 of the sun gear 3 is inserted in the through hole without coming into contact with the second coupling portion 44b due to the second coupling portion 44b supported as described.

Figure 7A:
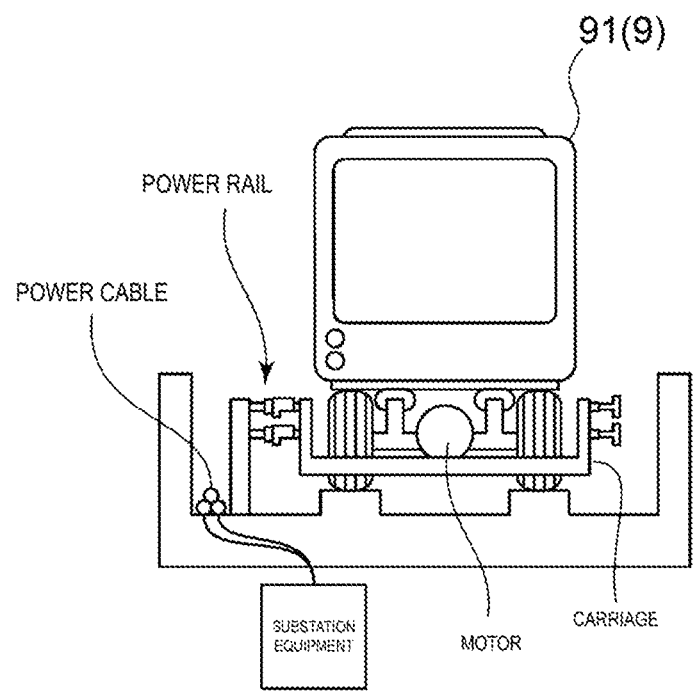
FIG. 7A is a diagram illustrating a current new traffic system, and is a schematic front view of the new traffic vehicle.
Figure 7B:
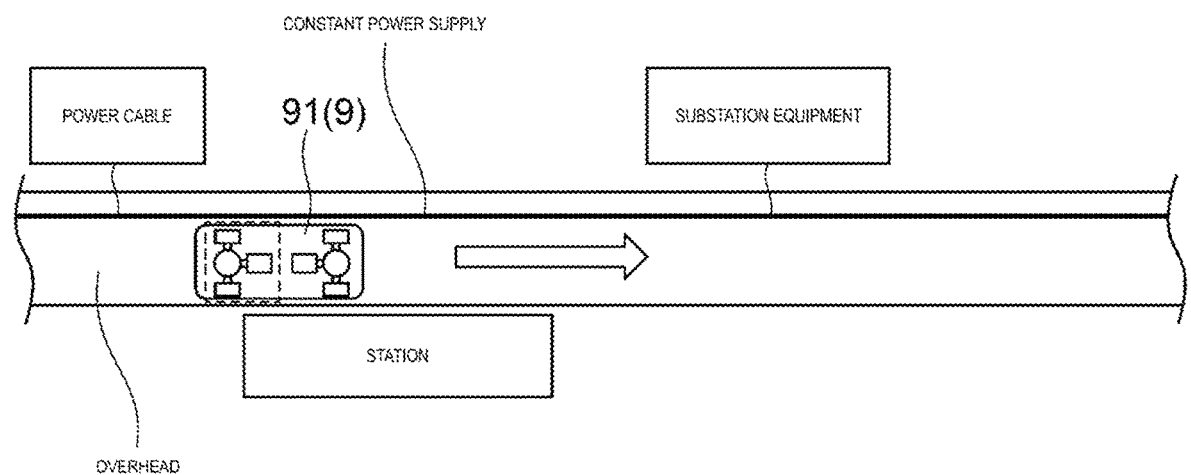
FIG. 7B is a diagram illustrating the current new traffic system, and is a bird's eye view illustrating the new traffic vehicle illustrated in FIG. 7A together with a traveling path.

The drive device 1 of the electric vehicle 9 having the above-described configuration does not include a large electric motor or differential gear, for example, as in a conventional electric vehicle 9 (see FIGS. 7A and 7B). Thus, a space is formed in the center of the vehicle body with the drive device 1 being positioned around the drive wheel 8 as illustrated in FIGS. 6A and 6B. This enables the new traffic vehicle 91 for example to have a battery 94 (on-vehicle battery) installed in this space formed in the center of the vehicle body, and thus to have the drive wheels 8 driven by power supplied from the battery 94 mounted on a carriage 93 or the like. Therefore, in the new traffic system, the electric vehicle 9 can be driven by the battery 94 without the need for laying a power cable along the traveling path. Similarly, the electric car 92 which has been plagued by a disadvantage such as a small cruising range compared with engine driven cars, can have a larger battery 94 installed to have a larger cruising range, or can have a larger cabin formed, and thus can have improved performance.

With the above-described configuration, the drive device 1 that drives the electric vehicle 9 is configured to drive the left and right drive wheels 8 of the electric vehicle 9 individually using the in-wheel motor 12, provided to each drive wheel 8, via the reduction gear 2. The reduction gear 2 has a mechanism in which the ring gear 5 (internal gear) in the planetary gear mechanism is divided in two, that is, into the fixed ring gear 51 in a state of being fixed to the reduction gear housing 2h or the like and the movable ring gear 52 that is not in the fixed state, with the ring gears interlocked by means of the first planetary gear 41 that meshes with the fixed ring gear 51 and the sun gear 3 and the second planetary gear 42 that is integrally coupled to the first planetary gear 41. Furthermore, the number of teeth of the first planetary gear 41 is smaller than the number of teeth of the second planetary gear 42 (first number of teeth $z_{p1}$<second number of teeth $Z_{p2}$), and the rotation of the movable ring gear 52 that is rotated by the second planetary gears 42 is transmitted to the drive wheel 8.

With this configuration, a reduction ratio larger than that achieved by a general planetary gear mechanism (with one planetary gear 4 and one ring gear 5) can be achieved. Thus, the electric vehicle 9 can be appropriately driven by the in-wheel motor 12 formed by a small high speed motor, for example, without employing a configuration in which the left and right drive wheels 8 are driven using a large electric motor via a differential gear for example. Furthermore, differential gears and large hypoid gears as well as a large electric motor in current new traffic vehicles 91 can be omitted, whereby enough battery space can be secured for the electric vehicle 9 due to a larger space being available on the carriage 93 of the new traffic vehicle 91 and the like. This enables a new traffic system requiring no overhead wiring for example.

Next, the transmission member 6 in an embodiment in which the reduction gear 2 and the in-wheel motor 12 having the above-described configuration are installed in various electric vehicles will be described in detail using FIGS. 1 to 4.

Case of Dual Tire

For example, each drive wheel 8 of a vehicle (new traffic vehicle 91) of a new traffic system has a dual tire configuration with two wheels 81 and tires 86 arranged in parallel to each other.

The vehicle employing such a dual tire configuration has, as illustrated in FIG. 1, the wheel spaces V described above on both sides of the disk portion 83. Thus, the reduction gear 2 installed more toward the vehicle outer side than the disk portion 83 can be accommodated within the wheel space V.

Thus, in some embodiments, the reduction gear 2 may be installed on the vehicle outer side relative to the disk portion 83. Specifically, in some embodiments, as illustrated in FIG. 1, the drive device 1 includes: an axle housing 12h that accommodates the in-wheel motor 12; the reduction gear housing 2h that accommodates the reduction gear 2 and is coupled to the axle housing 12h; and the tire shaft 84 having a tubular shape for coupling the drive wheel 8 (disk portion 83) and the transmission member 6 to each other. In this case, the axle housing 12h and the reduction gear housing 2h described above are provided inside the tire shaft 84. This enables the drive device 1 including the in-wheel motor 12 to be appropriately installed in the electric vehicle 9.

Furthermore, in some embodiments, as illustrated in FIGS. 1 and 2, the drive device 1 may further include a support member 7 that is installed on the outer circumferential surface of the axle housing 12h described above and supports the tire shaft 84 described above from the inside. The support member 7 may be a bearing. The flange 84f of the tire shaft 84 described above may be provided in a position, in the outer circumferential surface of the tire shaft 84, close to the support member 7 such as the position opposite to the support member 7 with the side wall of the tire shaft 84 provided in between. Thus, the support member 7 can be configured to support the vehicle body weight, to prevent the reduction gear 2 from receiving the vehicle body weight, whereby the reliability of the reduction gear 2 can be guaranteed.

In some embodiments, as illustrated in FIGS. 1 and 2, the transmission member 6 and the tire shaft 84 described above may be splined to each other. In the embodiment illustrated in FIGS. 1 and 2, the transmission member 6 includes an axle portion 64 having a plate (disk) shape. More specifically, the drive wheel side coupling portion 62 of the transmission member 6 described above includes a plate-shaped relay portion 63 having one end coupled to the ring side coupling portion 61 described above, and the axle portion 64 described above coupled to the other end of this relay portion 63. Further, in the present embodiment, the total length (diameter) of the axle portion 64 is larger than that of the drive wheel side coupling portion 62. A plurality of grooves are provided in the outer circumferential surface of the axle portion 64 at an equal interval, and these grooves fit the grooves provided in the end portion of the inner circumferential surface of the tire shaft 84, whereby the members are splined to each other.

With the above-described configuration, even if deformation occurs in the reduction gear 2 by, for example, the vehicle body weight acting on the reduction gear 2, the deformation can be absorbed by the spline coupling, whereby the influence of the structural deformation on the strength of the reduction gear 2 can be suppressed.

However, the present invention is not limited to the present embodiment, and in some other embodiments, the transmission member 6 and the tire shaft 84 may be coupled by means other than the spline coupling.

Furthermore, in some embodiments, as illustrated in FIGS. 1 and 2, the reduction gear housing 2h may include a first housing portion 21 fixed to the axle housing 12h, and a second housing portion 22 that is fixed to the axle housing 12h and fixes the fixed ring gear 51 described above. The first housing portion 21 and the second housing portion 22 may be splined to each other.

In the embodiment illustrated in FIGS. 1 and 2, the second housing portion 22 has a tubular shape. Furthermore, the transmission member 6 (in the present embodiment, the ring side coupling portion 61) is supported by a fourth bearing 68 to be rotatable relative to the second housing portion 22. The fourth bearing 68 is provided on the inner circumferential surface of an end portion of the second housing portion 22. Furthermore, the first housing portion 21 has a plate (disk) shape to close the other end portion of the second housing portion 22. A through hole is formed in a central portion of the first housing portion 21, and the rotation shaft 12r of the in-wheel motor 12 or the input shaft 31 of the sun gear 3 can be provided in the through hole without coming into contact with the first housing portion 21. Furthermore, the third bearing 67 is provided on the inner circumferential surface of the through hole of the first housing portion 21, and is configured to rotatably support the outer circumferential surface of the protruding portion 44p of the first coupling portion 44a of the carrier member 44.

With the above-described configuration, the influence of the structural deformation of the reduction gear 2 on the strength of the reduction gear 2 can be suppressed as described above.

However, the present invention is not limited to the present embodiment, and in some other embodiments, the first housing portion 21 and the second housing portion 22 may be coupled by means other than the spline coupling.

In some embodiments, as illustrated in FIGS. 1 and 2, the rotation shaft 12r of the in-wheel motor 12 and the sun gear 3 may be splined to each other. In the embodiment illustrated in FIGS. 1 and 2, the rotation shaft 12r of the in-wheel motor 12 and the input shaft 31 of the sun gear 3 are splined to each other. More specifically, a hollow part is formed in an end portion of the rotation shaft 12r of the in-wheel motor 12, and an end portion of the input shaft 31 of the sun gear 3 is inserted and installed in the hollow portion. A groove formed on the circumference of the hollow portion and a groove formed on the outer circumferential surface of the input shaft 31 of the sun gear 3 fit together, whereby the members are splined to each other.

With the above-described configuration, even when bending stress acts on the coupling portion between the rotation shaft 12r of the in-wheel motor and the sun gear, the bending stress can be absorbed by the spline coupling, whereby the influence of the structural deformation can be suppressed.

However, the present invention is not limited to the present embodiment, and in some other embodiments, the rotation shaft of the in-wheel motor and the sun gear may be coupled to each other by means other than the spline coupling.

In some embodiments, as illustrated in FIGS. 1 to 2, the drive device 1 may further include a spacer S disposed between the axle housing 12h and the reduction gear housing 2h. Furthermore, the axle housing 12h and the reduction gear housing 2h are coupled to each other via the spacer S.

In the embodiment illustrated in FIGS. 1 and 2, the spacer S has a tubular shape, is disposed between the axle housing 12h and the reduction gear housing 2h, and is fastened by bolts while being sandwiched between the axle housing 12h and the reduction gear housing 2h. Additionally, the in-wheel motor 12 is directly fixed to the first housing portion 21 by bolts. Thus, during assembly, after the in-wheel motor 12 is attached to the reduction gear housing 2h (first housing portion 21), for example, the spacer S is provided to the reduction gear housing 2h. Then, the spacer S and the axle housing 12h are installed in order so as to surround the in-wheel motor 12, and these three members are fixed (bolted) together in a state where the spacer S is sandwiched by the axle housing 12h and the reduction gear housing 2h. Thus, assembly of the drive device 1, including the assembling procedure of the drive device 1, can be easily performed.

With the configuration described above, the axle housing 12h and the reduction gear housing 2h are coupled to each other via the spacer S. Thus, the drive device 1 can be easily assembled, whereby the drive device 1 featuring high assemblability and maintainability can be provided.

Case of Single Tire

On the other hand, for example, the drive wheel 8 of the electric car 92 employs a single tire configuration with one wheel 81 and one tire 86 in many cases. As illustrated in FIG. 4, in the vehicle employing such a single tire configuration, the wheel space V described above may be formed only on the vehicle center side relative to the disk portion 83, or may also have an extremely small portion on the opposite side. Thus, when the reduction gear 2 is installed on the vehicle outer side relative to the disk portion 83, the reduction gear 2 protrudes outward from the vehicle body.

Thus, in some embodiments, the reduction gear 2 may be installed more toward the vehicle center side than the disk portion 83. Specifically, in some embodiments, as illustrated in FIG. 4, the drive device 1 further includes the reduction gear housing 2h that accommodates the reduction gear 2. The in-wheel motor 12 is disposed more toward the vehicle center side in the vehicle width direction than the disk portion 83 of the wheel 81 of the drive wheel 8, and the reduction gear housing 2h is disposed between the wheel motor 12 and the disk portion 83. Thus, the in-wheel motor 12, the reduction gear 2, the tire shaft 84, and the disk portion 83 are arranged in this order from the center side to the outer side in the vehicle width direction.

In the embodiment illustrated in FIG. 4, the drive device 1 further includes the tire shaft 84 described above and the fourth bearing 68 disposed inside the tire shaft 84. Furthermore, the transmission member 6 of the present embodiment includes, as the drive wheel side coupling portion 62, the axle portion 64 including: a first shaft portion 64a having a rod shape; and a second shaft portion 64b that has a plate (disk) shape for example and is coupled to each of the end portion of the first shaft portion 64a and the tire shaft 84. The reduction gear housing 2h includes a bearing support portion 23 having a tubular (cylindrical) shape and extending inside the tire shaft 84. The above-described fourth bearing 68 is provided on the outer circumferential surface of the bearing support portion 23 and is configured to rotatably support the first shaft portion 64a of the axle portion 64 in the transmission member 6.

More specifically, the transmission member 6 includes the ring side coupling portion 61 and the drive wheel side coupling portion 62 as described above, and the drive wheel side coupling portion 62 includes the relay portion 63 (described above) having a plate shape and having one end coupled to the ring side coupling portion 61 and the axle portion 64 coupled to the other end of the relay portion 63. The first shaft portion 64a and the second shaft portion 64b coupled to one end thereof in the axle portion 64 are coupled to the relay portion 63 via a third shaft portion 64c that has a plate (disk) shape and is coupled to the other end side of the first shaft portion 64a. In other words, the two plate shaped portions that are the second shaft portions 64b and the third shaft portions 64c are coupled to each other by the first shaft portion 64a having a rod shape, and thus the rotation of the third shaft portion 64c results in the rotation of the first shaft portion 64a and the second shaft portion 64b coupled thereto.

Furthermore, the second shaft portion 64b is coupled to the tire shaft 84, and the tire shaft 84 is rotatably supported by the fourth bearing 68 provided on the outer circumferential surface of the bearing support portion 23 described above. Thus, the tire shaft 84 can rotate relative to the bearing support portion 23. Thus, the rotation of the second shaft portion 64b results in integrated rotation of the tire shaft 84, and also results in integrated rotation of the drive wheel 8 coupled to the tire shaft 84. Furthermore, the vehicle body weight is supplied by the fourth bearing 68 so as not to act on the reduction gear 2.

In the embodiment described above, in some embodiments, the transmission member 6 (second shaft portion 64b) and the tire shaft 84 may be splined to each other (see FIG. 2). Similarly, in some embodiments, the reduction gear housing 2h may include the first housing portion 21 and the second housing portion 22 as described above and these components may be splined to each other. In some embodiments, the rotation shaft 12r of the in-wheel motor 12 and the sun gear 3 may be splined to each other. With such spline coupling, the influence of the structural deformation of the reduction gear 2 can be suppressed.

In the embodiment illustrated in FIG. 4, the in-wheel motor 12 is similar to that illustrated in FIGS. 1 and 2 in that the wheel motor 12 is directly fixed to the reduction gear housing 2h using, for example, bolts or the like. Still, a member such as the axle housing 12h as illustrated in FIGS. 1 and 2 is not provided. However, in the embodiment illustrated in FIG. 4, the drive device 1 may also include the axle housing 12h. In this case, as described above, the axle housing 12h may be configured to be coupled to the axle housing 12h with the spacer S provided in between.

With the above-described configuration, the in-wheel motor 12 and the reduction gear housing 2h (the reduction gear 2) are installed more toward the center side of the electric vehicle than the disk portion 83 of the wheel 81 of the drive wheel 8. Thus, even in the electric car with each drive wheel 8 employing the single tire configuration for example, the reduction gear 2 can be prevented from protruding outward from the vehicle body.

However, the present invention is not limited to the embodiment illustrated in FIGS. 1 to 4. In some other embodiments, the drive wheel 8 of the new traffic vehicle 91 may employ the single tire configuration. Furthermore, the drive wheel 8 of the electric car 92 may employ the dual tire configuration.

Figure 8:
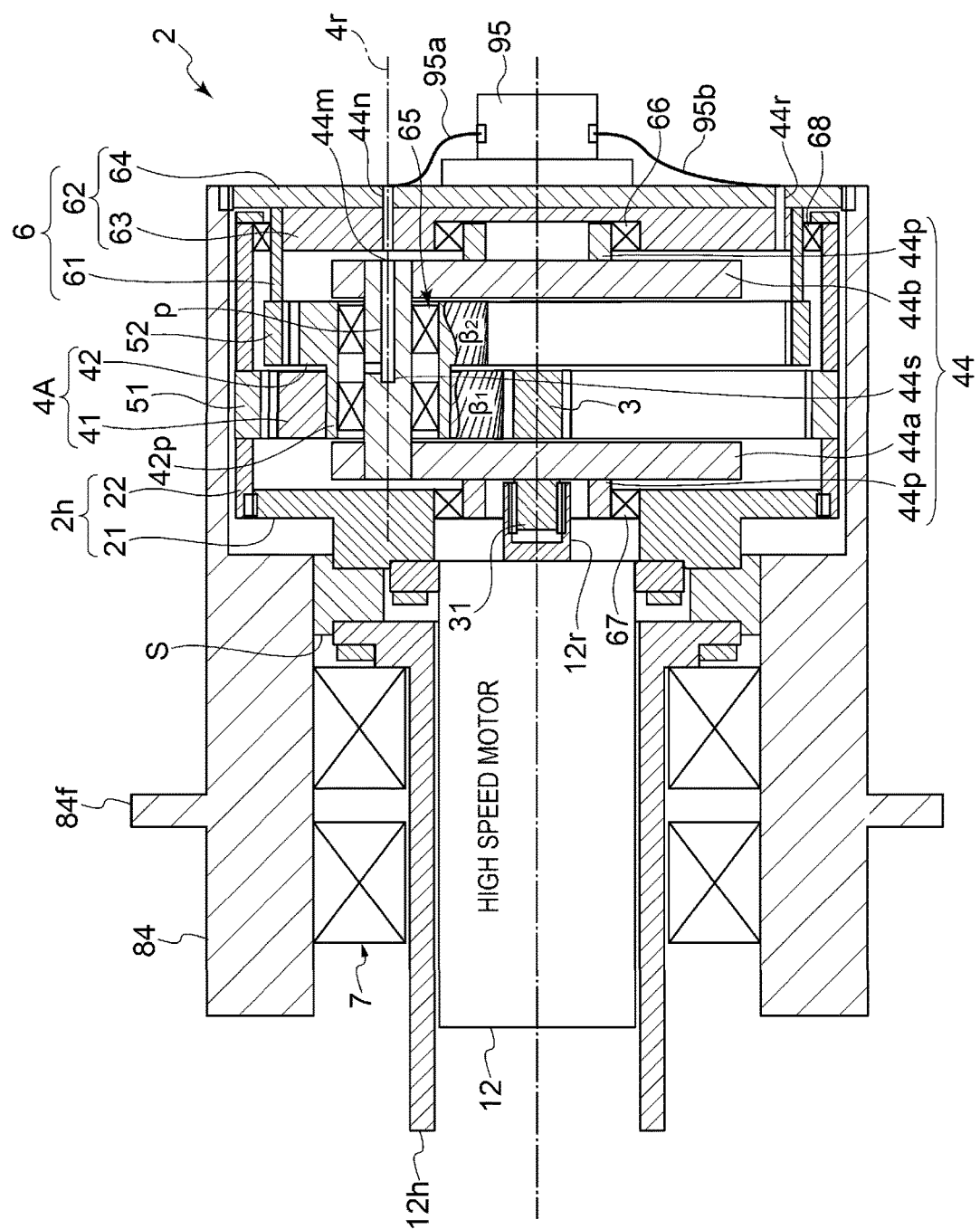
FIG. 8 is a cross-sectional view of the reduction gear including a helical gear according to an embodiment of the present invention, and illustrates an oil path formed in a shaft portion of a carrier member.
Figure 9A:
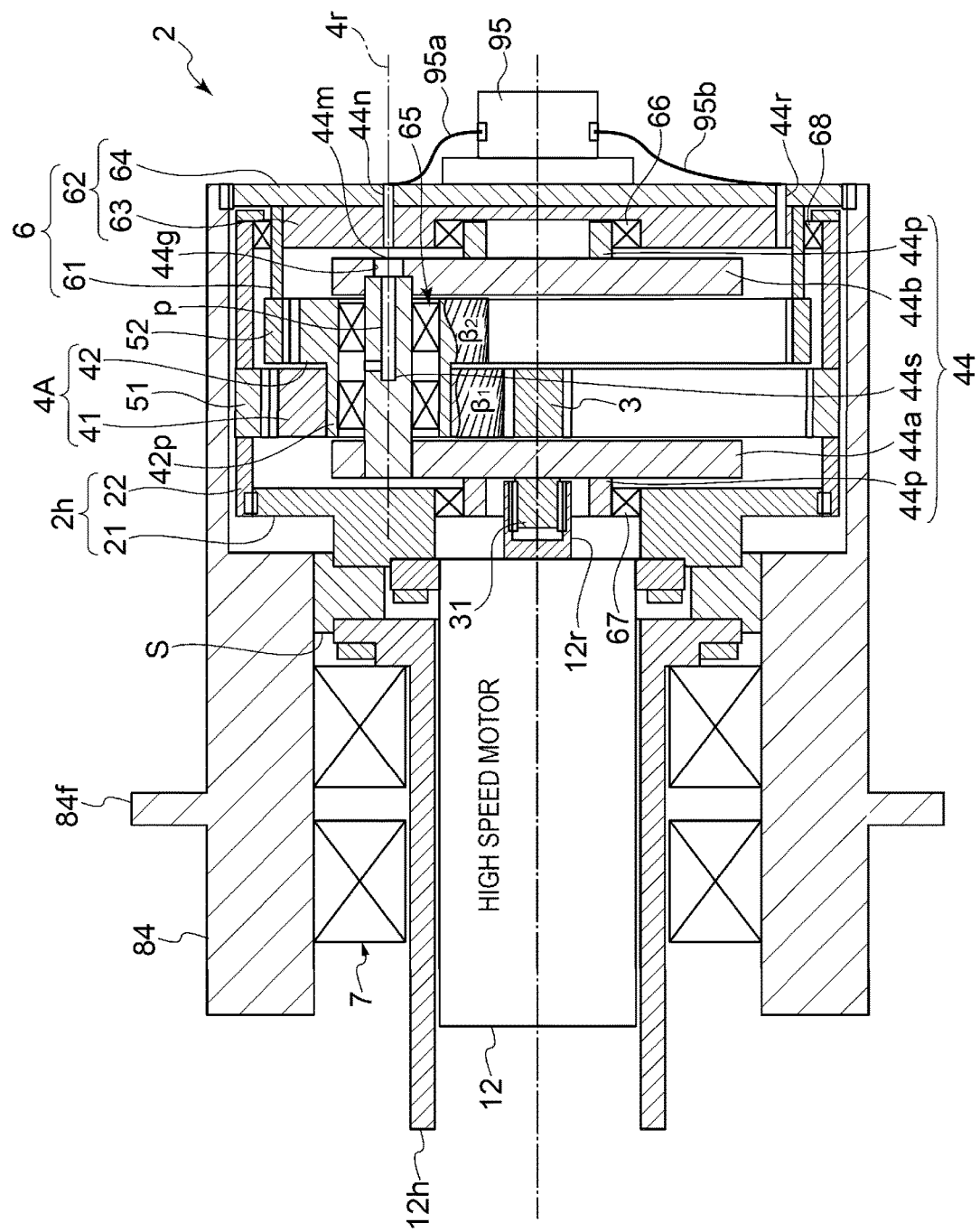
FIG. 9A is a cross-sectional view of a reduction gear including helical gears according to an embodiment of the present invention, including an oil path formed in the shaft portion of the carrier member as well as an oil groove of a second coupling portion.
Figure 9B:
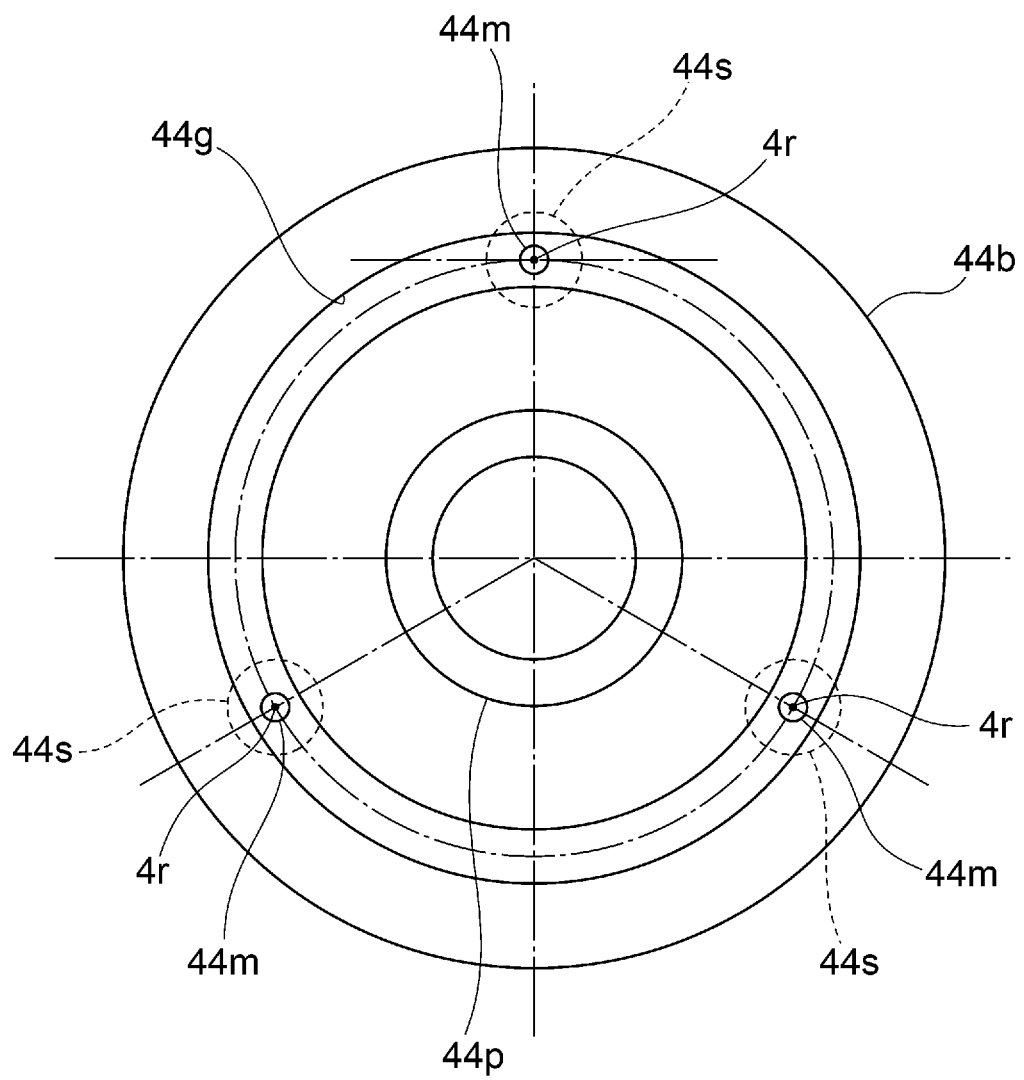
FIG. 9B is a diagram illustrating a surface of the second coupling portion illustrated in FIG. 9A.

Next, an embodiment for improving the efficiency and reducing vibration of the above-described drive device 1 will be described using FIGS. 8 to 9b. FIG. 8 is a cross-sectional view of the reduction gear 2 including a helical gear according to an embodiment of the present invention, and illustrates an oil path formed in the shaft portion 44s of the carrier member 44. FIG. 9A is a cross-sectional view of the reduction gear 2 including a helical gear according to an embodiment of the present invention, and illustrates an oil path formed in the shaft portion 44s of the carrier member 44 as well as an oil groove 44g of the second coupling portion 44b. FIG. 9B is a diagram illustrating a surface of the second coupling portion 44b illustrated in FIG. 9A.

As described above, in the drive device 1, rotation of the in-wheel motor 12 leads to rotation of the sun gear 3 of the reduction gear 2, causing the transmission member 6 to rotate by the predetermined reduction ratio R, resulting in rotation of the drive wheel 8 (see FIGS. 1 to 5). In this process, the sun gear 3, the two types of planetary gears 4 (the first planetary gear 41 and the second planetary gear 42), and the two types of ring gears 5 (the fixed ring gear 51 and the movable ring gear 52) are preferably helical gears instead of spur gears, for rotating the drive wheel 8 with a lower load (higher rotation) using the same amount of output from the in-wheel motor 12.

However, rotation of the helical gear involves thrust force (tangential force) acting in a direction along the rotational shaft of the gear, resulting in increased loads acting on the bearings (the first bearings 65) respectively supporting the first planetary gear 41 and the second planetary gear 42. Thus, if the thrust force on the first planetary gear 41 side (produced due to the meshing between the first planetary gear 41 and the fixed ring gear 51) and the thrust force on the second planetary gear 42 side (produced due to the meshing between the second planetary gear 42 and the movable ring gear 52) are of the same magnitude and act in the opposite directions, smooth rotation of the reduction gear 2 can be achieved while suppressing vibration and with a load acting on the first bearing 65 suppressed compared with a case where spur gears are used. Thus, an increase in efficiency and reduction of vibration of the drive device 1 can be achieved.

Accordingly, in some embodiments, the first planetary gears 41 and the second planetary gears 42 described above as illustrated in FIG. 8 may be helical gears having opposite helix angles. In this case, the sun gear 3 and the fixed ring gear 51 also need to be helical gears that can mesh with the first planetary gears 41, and the movable ring gear 52 also needs to be a helical gear that can mesh with the second planetary gears 42. As a result, the thrust force on the first planetary gears 41 side and the thrust force on the second planetary gear 42 side can act in opposite directions.

In addition, the helix angle of the first planetary gear 41 (hereinafter, referred to as a first helix angle $\beta_1$ as appropriate), and the helix angle of the second planetary gear 42 (hereinafter, referred to as "second helix angle $\beta_2$" as appropriate) are determined to satisfy the relationship defined in the following Formula [1]. Specifically, $\beta_1$ and $\beta_2$ satisfy the relationship defined in the following Formula [1], where $\beta_1$ represents the helix angle of the first planetary gear 41, $P_1$ represents tangential force (hereinafter, referred to as first tangential force as appropriate) produced in accordance with this helix angle, $\beta_2$ represents the helix angle of the second planetary gear 42, and $P_2$ represents tangential force (hereinafter, referred to as second tangential force as appropriate) produced in accordance with this helix angle.

$$\beta_2 = \tan^{-1}\{(P_1/P_2)\cdot\tan(\beta_1)\} \quad [1]$$

The above Formula [1] will be described in detail. For example, thrust force $F_1$ on the first planetary gear 41 side with the first number of teeth $Z_{p1}$, thrust force $F_2$ on the second planetary gear 42 side with the second number of teeth $Z_{p2}$, and the helix angles satisfy the relationship as defined in the following Formulae [2] and [3].

$$F_1 = P_1\cdot\tan(\beta_1) \quad [2]$$

$$F_2 = P_2\cdot\tan(\beta_2) \quad [3]$$

Furthermore, the first tangential force and the second tangential force are obtained as follows.

Torque $T_{s1}$ input to the sun gear 3, torque $T_c$ of the transmission member 6, and torque $T_{r2}$ (output torque) of the movable ring gear 52 (the internal gear on the second stage) satisfy the relationship as defined in the following Formula [4] which is the equations of equilibrium regarding the moment acting on each axis on each rotation shaft. Furthermore, $T_{r2}$ described above is obtained by the following Formula [5], where R represents the reduction ratio R of the reduction gear 2.

$$T_{s1} + T_c = T_{r2} \quad [4]$$

$$T_{r2} = R\cdot T_{s1} \quad [5]$$

Based on the above Formulae [4] and [5], the output torque ($T_c$) described above is obtained from Formula [6].

$$T_c = T_{r2} - T_{s1} = R\cdot T_{s1} - T_{s1} = T_{s1}\cdot(R-1) \quad [6]$$

The tangential force is obtained based on the torque/gear pitch radius. Thus, the first tangential force and the second tangential force described above are respectively obtained from the following Formulae [7] and [8], where $R_{s1}$ represents the pitch radius of the sun gear 3, and $R_{r2}$ represents the pitch radius of the movable ring gear 52 that meshes with the second planetary gear 42.

$$P_1 = T_{s1}/R_{s1} \quad [7]$$

$$P_2 = T_{r2}/R_{r2} \quad [8]$$

Thus, based on the relationship $P_1 = P_2$, the relationship as defined in the Formula [1] described above is established. Furthermore, the first helix angle $\beta_1$ and the second helix angle $\beta_2$ are determined to satisfy this relationship. For example, first of all, the first number of teeth $Z_{s1}$ of the sun gear 3, the first number of teeth $Z_{p1}$ of the first planetary gear 41, the second number of teeth $Z_{p2}$ of the second planetary gear 42, the number of teeth of $Z_{r1}$ of the fixed ring gear 51, and the number of teeth $Z_{r2}$ of the movable ring gear 52 are determined (see FIG. 3), and the pitch radius $R_{s1}$ of the sun gear 3, the pitch radius $R_{r2}$ of the movable ring gear 52 that meshes with the second planetary gear 42, and the torque $T_{s1}$ input to the sun gear 3 are determined. Then, the first tangential force and the second tangential force are calculated from Formulae [7] and [8]. Then, the first helix angle $\beta_1$ of the first planetary gear 41 and the second helix angle $\beta_2$ of the second planetary gear 42 are obtained from the relationship as defined in Formula [1] described above. Thus, the helix angles ($\beta_1$, $\beta_2$) of the first planetary gears 41 and the second planetary gear 42 can be obtained to achieve the thrust force on the first planetary gears 41 side and the thrust force on the second planetary gear 42 side that cancel out each other (cancel).

With the above-described configuration, the sun gear 3, the two types of planetary gears 4 (the first planetary gear 41 and the second planetary gear 42), and the two types of ring gears 5 (the fixed ring gear 51 and the movable ring gear 52) are each a helical gear. The helix angle of the first planetary gear 41 and the helix angle of the second planetary gears 42 are selected to achieve the thrust forces that are produced by the meshing of the gears and cancel out each other. As a result, smoother meshing between the helical gears is achieved (with an increased meshing ratio), whereby the vibrations produced by the meshing between the gears are reduced from that in a case where the spur gears are used, and the sun gear 3 can be rotated at a higher speed by input from the in-wheel motor 12. As a result, the load on the bearings (the first bearings 65) that rotatably supports the shaft portion 44s of the carrier member 44 that extends into the through hole of each of the first planetary gear 41 and the second planetary gear 42 can be reduced, whereby improvement of reliability of the first bearing 65 and downsizing of the first bearing 65 can be achieved.

Furthermore, in some embodiments, as illustrated in FIGS. 8 to 9B, in addition to or instead of the application of the helical gears to the reduction gear 2 described above, the reduction gear 2 may have a configuration in which lubricating oil is supplied to the first bearing 65 that supports the shaft portion 44s of the carrier member 44 described above, extending along the rotation shaft of a composite planetary gear 4A including the first planetary gear 41 and the second planetary gear 42 coupled to each other.

Specifically, in some embodiments, as illustrated in FIGS. 8 to 9B, the above-described reduction gear 2 includes: a plurality of composite planetary gears 4A each including the first planetary gear 41 and the second planetary gear 42; the carrier member 44 described above that defines (positioning) the interval between the plurality of composite planetary gears 4A arranged around the sun gear 3; and the plurality of first bearings 65 described above that rotatably support the plurality of respective shaft portions 44s of the carrier member 44. The carrier member 44 makes the plurality of composite planetary gears 4A arranged around the sun gear 3 while being separated from each other (at an equal interval). Note that, as described above, the carrier member 44 includes: the plurality of shaft portions 44s that extend along the rotation shafts 4r of the plurality of respective composite planetary gears 4A; the plate-shaped first coupling portion 44a to which one end portion of each of the plurality of shaft portions 44s is coupled; and the second coupling portion 44b to which the other end portion of each of the shaft portions 44s is similarly coupled.

Furthermore, the oil path p is formed inside each of the plurality of shaft portions 44s of the carrier member 44, for guiding lubricating oil F, supplied from an oil supply port 44m formed in an end portion of each of the shaft portions 44s, to the first bearing 65 supporting the shaft portion 44s. At least one of the transmission member 6 or the reduction gear housing 2h has a nozzle portion 44n that is positioned to face the oil supply port 44m and injects the lubricating oil F toward the oil supply port 44m.

The number of nozzle portions 44n may be any number that is equal to or larger than 1, and thus may be the same as or different from (larger than or smaller than) the number of shaft portions 44s. For example, if the number of the nozzle portions 44n is the same as the number of the shaft portions 44s, the lubricating oil F can be supplied to all of the first bearings 65 at the same timing. Furthermore, the shape of the opening (injection port) at the tip of the nozzle portion 44n and the shape of the oil supply port 44m may be a circle or a shape having a longer direction in the rotation direction for example (such as an oval, arched shape, or a rectangle). The injection port and the oil supply port 44m may have the same shape or different shapes. Direct supplying of the lubricating oil F, injected from the nozzle portion 44n, to the oil supply port 44m is facilitated with a larger area of the oil supply port 44m and a longer length in the rotation direction.

As illustrated in FIG. 8, the nozzle portion 44n is connected to a lubricating oil unit 95 through a lubricating oil supply line 95a connected to an end portion on the side opposite to the injection port thereof, and thus the lubricating oil F is supplied from the lubricating oil unit 95 to the nozzle portion 44n. The lubricating oil unit 95 includes a pump for example that can pump the lubricating oil F into the lubricating oil supply line 95a. Furthermore, the lubricating oil F supplied to the nozzle portion 44n is injected toward the oil supply port 44m of the shaft portion 44s. In this process, the injection port of the nozzle portion 44n and the oil supply port 44m of the shaft portion 44s rotate at different speeds and in different directions. The lubricating oil F is mainly supplied to the oil path p and to the first bearing 65, at a timing at which these ports overlap as viewed in the direction of the rotation shaft 4r.

With the lubricating oil F supplied to the plurality of first bearings 65 in this manner, in some embodiments, an annular oil groove 44g may be formed in the surface of at least one of the first coupling portion 44a and the second coupling portion 44b facing the nozzle portion 44n. The oil groove 44g passes through the oil supply ports 44m of the plurality of shaft portions 44s as illustrated in FIGS. 9A and 9B. Thus, the nozzle portion 44n and the oil supply port 44m of the shaft portion 44s rotate relative to one another drawing a circular trajectory. Thus, with the annular oil groove 44g formed on the surface described above to overlap with the circular trajectory, the lubricating oil F injected from the nozzle portion 44n is injected (supplied) to at least one of the oil supply port 44m and the oil groove 44g, regardless of the injection timing. The lubricating oil F injected into the oil groove 44g flows along the oil groove 44g to reach any of the oil supply ports 44m, and thus the lubricating oil F can be efficiently supplied to the oil path p.

In the embodiment illustrated in FIGS. 8 to 9B, the nozzle portion 44n is a hole portion formed in the transmission member 6 or the reduction gear housing 2h. More specifically, the nozzle portion 44n (hole portion) is formed through the transmission member 6 or the reduction gear housing 2h along the extension direction of the rotation shaft 4r of the shaft portion 44s. The nozzle portion 44n may have the injection port protruding from the end portion of the hole portion described above, with a tubular member fit in the hole portion described above.

In the embodiment illustrated in FIGS. 8 to 9B, the oil supply port 44m of the oil path p is provided only in the end portion of the shaft portion 44s on the transmission member 6 side. The nozzle portion 44n is provided to the transmission member 6. In some other embodiments, the oil supply port 44m of the oil path p may be provided only in the end portion of the reduction gear housing 2h on the first housing portion 21 side. In this case, the nozzle portion 44n is provided to the first housing portion 21. In some other embodiments, these embodiments may be combined. In such a case, the oil supply port 44m of the oil path p is provided at both ends of the shaft portion 44s, and the nozzle portion 44n is provided to the transmission member 6 and to the first housing portion 21. Furthermore, two oil paths p are provided without communicating with each other.

In the embodiment illustrated in FIGS. 8 to 9B, the first bearing 65 includes two bearings disposed in the through hole of the composite planetary gear 4A while being separated from each other. More specifically, the two bearings that are the above-described first bearings 65 are respectively disposed inside the through holes of the first planetary gears 41 and the second planetary gears 42 forming the composite planetary gear 4A. The outlet of the oil path p is provided between the two bearings. Thus, the lubricating oil F supplied from between the two bearings to the through hole of the composite planetary gear 4A flows from the outlet position toward the two bearings on the left and right sides. Thus, the lubricating oil F is supplied to the first bearings 65.

Furthermore, in some embodiments, as illustrated in FIG. 8, a lubricating oil circulation hole 44r may be formed in at least one of the transmission member 6 or the reduction gear housing 2h. The lubricating oil circulation hole 44r is a hole formed in a position farther in the radial direction from the rotation shaft 12r of the in-wheel motor 12 than the nozzle portion 44n. The lubricating oil circulation hole 44r is connected to the lubricating oil unit 95 through a lubricating oil return line 95b. Thus, the lubricating oil F discharged from the lubricating oil circulation hole 44r flows through the lubricating oil return line 95b to the lubricating oil unit 95.

In the embodiment illustrated in FIG. 8, the space between the transmission member 6 and the second coupling portion 44b of the carrier member 44 is on the inner side of the annular ring side coupling portion 61 described above. Thus, the lubricating oil F injected from the nozzle portion 44n and not supplied to the oil path p flows toward the inner wall surface side of the ring side coupling portion 61 due to centrifugal force. The lubricating oil circulation hole 44r is formed in the route of such a flow. Thus, the lubricating oil F flows through the lubricating oil circulation hole 44r and the lubricating oil return line 95b in this order, and then returns to the lubricating oil unit 95.

However, in some other embodiments, the lubricating oil circulation hole 44r and the lubricating oil return line 95b may not be provided. In the embodiment illustrated in FIGS. 8 to 9B described above, the lubricating oil unit 95 and the lubricating oil supply line 95a are formed outside the transmission member 6, but the present invention is not limited to this embodiment. For example, it might be difficult to arrange the lubricating oil unit 95 near the nozzle portion 44n as in the example illustrated in FIG. 8, such as in a case where the nozzle portion 44n is formed in the first housing portion 21 and a case where the nozzle portion 44n is formed in the transmission member 6 in the embodiment illustrated in FIG. 4. In such cases, other holes may be formed within the first housing portion 21, the transmission member 6, and other members, to be connected to the nozzle portion 44n that is a non-through hole. A part of the lubricating oil supply line 95a may be formed by such an additional hole or by providing an additional line connecting a plurality of holes to each other. Thus, a degree of freedom in the arrangement portion of the lubricating oil unit 95 can be increased.

With the above-described configuration, a bearing (first bearing 65) that supports the shaft portion 44s of the carrier member 44 defining the interval of the plurality of composite planetary gears 4A arranged around the sun gear 3 is disposed in through holes (inside) of the plurality of composite planetary gears 4A formed in the first planetary gear 41 and the second planetary gear 42 coupled to each other. Furthermore, the oil path p is formed inside the shaft portion 44s, and thus the lubricating oil F injected from the nozzle portion 44n passes through the oil path p of the shaft portion 44s to be supplied to the bearings. Thus, the lubricating oil F can be supplied to the bearings described above. Furthermore, the lubricating oil F supplied to the bearings also flows to the various gears described above in the reduction gear 2, so that the gears can smoothly meshed. Thus, the bearings and the gears can be appropriately lubricated, and a longer service life of the bearings can be achieved.

The present invention is not limited to the embodiments described above, and also includes a modification of the above-described embodiments as well as appropriate combinations of these modes.

[Notes]

(1) A drive device (1) for an electric vehicle (9) according to at least one embodiment of the present invention is a drive device (1) for an electric vehicle (9) including:
an in-wheel motor (12);
a reduction gear (2) that reduces rotational speed of the in-wheel motor (12) and transmits resultant rotation to a drive wheel (8) of the electric vehicle (9);
an axle housing (12h) that accommodates the in-wheel motor (12);
a reduction gear housing (2h) that accommodates the reduction gear (2) and is coupled to the axle housing (12h); and
a tire shaft (84) having a tubular shape that couples the drive wheel (8) and the reduction
device (2) to each other,
the reduction gear (2) including:
a sun gear (3) driven by the in-wheel motor (12);
a first planetary gear (41) that is arranged to be meshed with the sun gear (3) and has a first number of teeth ($Z_{p1}$);
a fixed ring gear (51) that is meshed with the first planetary gear (41) and arranged non-rotatably,
a second planetary gear (42) that is coupled to the first planetary gear (41) and has a second number of teeth (42) that is smaller than the first number of teeth ($Z_{p1}$);
a movable ring gear (52) that is meshed with the second planetary gear (42) and arranged rotatably; and
a transmission member (6) that transmits rotation of the movable ring gear (52) to the drive wheel (8),
wherein the axle housing (12h) and the reduction gear housing (2h) are arranged inside the tire shaft (84), and
the tire shaft (84) couples the drive wheel (8) and the transmission member (6) to each other.

With the above-described configuration (1), the drive device (1) that drives the electric vehicle (9) is configured to drive the left and right drive wheels (8) of the electric vehicle (9) individually using the in-wheel motor (12), provided to each drive wheel (8), via the reduction gear (2). The reduction gear (2) has a mechanism in which the ring gear (5) (internal gear) in the planetary gear mechanism (4) is divided in two, that is, into the fixed ring gear (51) in a state of being fixed to the reduction gear housing (2h) or the like and the movable ring gear (52) that is not in the fixed state, with the ring gears interlocked by means of the first planetary gear (41) that meshes with the fixed ring gear (51) and the sun gear (3) and the second planetary gear (42) that is integrally coupled to the first planetary gear (41). Furthermore, the number of teeth of the first planetary gear (41) is smaller than the number of teeth of the second planetary gear (42) ($Z_{p1} > Z_{p2}$), and the rotation of the movable ring gear (52)52 that is rotated by the second planetary gears (42) is transmitted to the drive wheel (8)8.

With this configuration, a reduction ratio (R) larger than that achieved by a general planetary gear (4) mechanism (with one planetary gear (4) and one ring gear (5)) can be achieved. Thus, the electric vehicle (9) can be appropriately driven by the in-wheel motor (12) formed by a small high speed motor, for example, without employing a configuration in which the left and right drive wheels (8) are driven using a large electric motor via a differential gear for example (see FIGS. 7A and 7B). Furthermore, differential gears and large hypoid gears as well as a large electric motor in current new traffic vehicles (91) can be omitted, whereby enough battery space can be secured for the electric vehicle (9) due to a larger space being available on the carriage (93) of the new traffic vehicle (91) and the like (see FIGS. 6A and 6B). This enables a new traffic system requiring no overhead wiring for example.

(2) In some embodiments, the configuration of (1) above further includes a supporting member (7) that is disposed on an outer circumferential surface of the axle housing (12h) and supports the tire shaft (84).

With the above-described configuration (2), the vehicle body weight is supported by the supporting member (7), for example, positioned more toward the center side of the electric vehicle (9) than the reduction gear (2). As a result, the vehicle body weight can be prevented from acting on the reduction gear (2), and the reliability of the reduction gear (2) can be ensured.

(3) In some embodiments, in the configurations of (1) and (2) above, the transmission member (6) and the tire shaft (84) are splined to each other.

With the above-described configuration (3), even if deformation occurs in the reduction gear (2) by, for example, the vehicle body weight acting on the reduction gear (2), the deformation can be absorbed by the spline coupling, whereby the influence of the structural deformation on the strength of the reduction gear (2) can be suppressed.

(4) In some embodiments, in the configurations of (1) to (3) above,
the reduction gear housing (2h) includes
a first housing portion (21) fixed to the axle housing (12h), and
a second housing portion (22) fixed to the axle housing (12h) and fixing the fixed ring gear (51), and the first housing portion (21) and the second housing portion (22) are splined to each other.

With the above-described configuration (4), the influence of the structural deformation of the reduction gear (2) on the strength of the reduction gear (2) can be suppressed as described above (2).

(5) In some embodiments, in the configurations of (1) to (4) above, a rotation shaft (12r) of the in-wheel motor (12) and the sun gear (3) are splined to each other.

With the above-described configuration (5), even when bending stress acts on the coupling portion (42p) between the rotation shaft (12r) of the in-wheel motor (12) and the sun gear (3), the bending stress can be absorbed by the spline coupling, whereby the influence of the structural deformation of the reduction gear (2) can be suppressed.

(6) In some embodiments, the configurations of (1) to (5) above further include a spacer (S) provided between the axle housing (12h) and the reduction gear housing (2h), the axle housing (12h) and the reduction gear housing (2h) being coupled to each other via the spacer. (S)

With the configuration described above (6), the axle housing (12h) and the reduction gear housing (2h) are coupled to each other via the spacer (S). Thus, the drive device (1) can be easily assembled, whereby the drive device (1) featuring high assemblability and maintainability can be provided.

(7) A drive device (1) for an electric vehicle (9) according to at least one embodiment of the present invention is a drive device (1) for an electric vehicle (9) including:

an in-wheel motor (12);
a reduction gear (2) that reduces rotational speed of the in-wheel motor (2) and transmits resultant rotation to a drive wheel (8) of the electric vehicle (9);
a reduction gear housing (2h) that accommodates the reduction gear (2),
the reduction gear (2) including:
a sun gear (3) driven by the in-wheel motor (12);
a first planetary gear (41) that is arranged to be meshed with the sun gear (3) and has a first number of teeth ($Z_{p1}$);
a fixed ring gear (51) that is meshed with the first planetary gear (41) and arranged non-rotatably,
a second planetary gear (42) that is coupled to the first planetary gear (41) and has a second number of teeth (42) that is smaller than the first number of teeth ($Z_{p1}$);
a movable ring gear (52) that is meshed with the second planetary gear (42) and arranged rotatably; and
a transmission member (6) that transmits rotation of the movable ring gear (52) to the drive wheel (8),
wherein the in-wheel motor (12) is disposed more toward a center side of the electric vehicle (9) than a disk portion (83) of a wheel (81) of the drive wheel (8), and
the reduction gear housing (2h) is disposed between the in-wheel motor (12) and the disk portion (83).

With the above-described configuration (7), the in-wheel motor (12) and the reduction gear housing (2h) are installed more toward the center side of the electric vehicle (9) than the disk portion (83) of the wheel (81) of the drive wheel (8). Thus, even in the electric car with each drive wheel (8) employing the single tire (86) configuration for example, the reduction gear (2) can be prevented from protruding outward from the vehicle body.

(8) In some embodiments, the configuration of (7) above further includes:

a tire shaft (84) having a tubular shape that couples the drive wheel (8) and the transmission member (6) to each other; and
a bearing provided inside the tire shaft (84), wherein the transmission member (6) includes an axle portion (64) including a first shaft portion (64a) having a rod shape, and a second shaft portion (64b) coupled to each of an end portion of the first shaft portion (64a) and the tire shaft (84),
the reduction gear housing (2h) includes a bearing support portion (23) having a tubular shape that extends inside the tire shaft (84), and
the bearing is provided on an outer circumferential surface of the bearing support portion (23) and rotatably supports the first shaft portion (64a).

With the above-described configuration (8), the in-wheel motor (12) and the reduction gear housing (2h) can be installed more toward the center side of the electric vehicle (9) than the disk portion (83) of the wheel (81).

(9) In some embodiments, in the configurations of (1) to (8) above, wherein the first planetary gear (41) and the second planetary gear (42) are helical gears with opposite helix angles, and
the first planetary gear (41) and the second planetary gear (42) have a first helix angle ($\beta_1$) and a second helix angle ($\beta_2$) respectively, which satisfy a relationship:

$$\beta_2 = \tan^{-1}\{(P_1/P_2)\cdot\tan(\beta_1)\},$$

where $\beta_1$ represents the first helix angle of the first planetary gear (41),
$P_1$ represents a first tangential force produced in accordance with the first helix angle,
$\beta_2$ represents the second helix angle of the second planetary gear (42), and
$P_2$ represents a second tangential force produced in accordance with the second helix angle.

With the above-described configuration (9), the sun gear (3), the two types of planetary gears (4) (the first planetary gear (41) and the second planetary gear (42)), and the two types of ring gears (5) (the fixed ring gear (51) and the movable ring gear (52)) are each a helical gear. The helix angle ($\beta_1$) of the first planetary gear (41) and the helix angle ($\beta_2$) of the second planetary gears (42) are selected to achieve the thrust forces that are produced by the meshing of the gears and cancel out each other. As a result, smoother meshing between the helical gears is achieved (with an increased meshing ratio), whereby the vibrations produced by the meshing between the gears are reduced from that in a case where the spur gears are used, and the sun gear (3) can be rotated at a higher speed by input from the in-wheel motor (12). As a result, the load on the bearings (the first bearings (65)) that rotatably supports the shaft portion (44s) of the carrier member (44) that extends into the through hole of each of the first planetary gear (41) and the second planetary gear (42) can be reduced, whereby improvement of reliability of the first bearing (65) and downsizing of the first bearing (65) can be achieved.

(10) In some embodiments, in the configurations of (1) to (9) above, the reduction gear (2) further includes:
a plurality of composite planetary gears 4A) each of which includes the first planetary gear (41) and the second planetary gear (42) coupled to each other;
a carrier member (44) that defines an interval between the plurality of composite planetary gears (4A) arranged around the sun gear (3), the carrier member (44) including:

a plurality of shaft portions (44s) extending along rotation shafts (4r) of the plurality of respective composite planetary gears (4A);

a plate-shaped first coupling portion (44a) to which one end portion of each of the plurality of shaft portions (44s) is coupled; and a plate-shaped second coupling portion (44b) to which another end portion of each of the plurality of shaft portions (44s) is coupled, and a plurality of bearings (first bearings 65) rotatably supporting the plurality of respective shaft portions (44s), wherein an oil path (p) is formed inside each of the plurality of shaft portions (44s), for guiding lubricating oil (F) to the bearing (65) supporting the shaft portion (44s), the lubricating oil (F) being supplied from an oil supply port (44m) formed in an end portion of the shaft portion (44s), and at least one of the transmission member (6) and the reduction gear housing (2h) has a nozzle portion (44n) that is provided at a position facing the oil supply port (44m) and injects the lubricating oil (F) toward the oil supply port (44m).

With the above-described configuration (10), a bearing (first bearing 65) that supports the shaft portion (44s) of the carrier member (44) defining the interval of the plurality of composite planetary gears (4A) arranged around the sun gear (3) is disposed in through holes (inside) of the plurality of composite planetary gears (4A) formed in the first planetary gear (41) and the second planetary gear (42) coupled to each other. Furthermore, the oil path (p) is formed inside the shaft portion (44s), and thus the lubricating oil (F) injected from the nozzle portion (44n) passes through the oil path (p) of the shaft portion (44s) to be supplied to the bearings. Thus, the lubricating oil (F) can be supplied to the bearings (65) described above. Furthermore, the lubricating oil (F) supplied to the bearings (65) also flows to the various gears (3, 4, 5) described above in the reduction gear (2), so that the gears can smoothly meshed. Thus, the bearings (65) and the gears (3, 4, 5) can be appropriately lubricated, and a longer service life of the bearings can be achieved.

(11) In some embodiments, in the configuration of (10) above, wherein a surface of at least one of the first coupling portion (44a) and the second coupling portion (44b) facing the nozzle portion (44n) is provided with an oil groove (44g) having an annular shape that passes through the oil supply port (44m) of each of the plurality of shaft portions (44s).

With the above-described configuration (11), the lubricating oil (F) injected from the nozzle portion (44n) is injected (supplied) to at least one of the oil supply port (44m) or the oil groove (44g) of the shaft portion (44s), and the lubricating oil (F) injected into the oil groove (44g) is configured to flow along the oil groove (44g) toward the oil supply port (44m). This allows the supply of the lubricating oil (F) to the oil path (p) to be performed more efficiently.

(12) The electric vehicle (9) according to at least one embodiment of the present invention comprises: A drive device (1) of the electric vehicle (9) described in any one of the above (1) to (11).

According to the configuration of (12) above, effects similar to those described above (1) to (11) are achieved.

While preferred embodiments of the invention have been described as above, it is to be understood that variations and modifications will be apparent to those skilled in the art without departing from the scope and spirits of the invention. The scope of the invention, therefore, is to be determined solely by the following claims.

The invention claimed is:

1. A drive device for an electric vehicle, the drive device comprising:

a motor configured to be installed at a position adjacent to a drive wheel of the electric vehicle;

a reduction gear configured to reduce rotational speed of the motor and transmit resultant rotation to the drive wheel;

an axle housing that accommodates the motor;

a reduction gear housing that accommodates the reduction gear and is coupled to the axle housing; and a tire shaft having a tubular shape and being configured to couple the drive wheel and the reduction gear to each other, the reduction gear comprising:

a sun gear configured to be driven by the motor;

a first planetary gear that is configured to be meshed with the sun gear and has a first number of teeth;

a fixed ring gear that is meshed with the first planetary gear and arranged non-rotatably;

a second planetary gear that is coupled to the first planetary gear and has a second number of teeth that is smaller than the first number of teeth;

a movable ring gear that is meshed with the second planetary gear and arranged rotatably; and a transmission member configured to transmit rotation of the movable ring gear to the drive wheel, wherein:

the axle housing and the reduction gear housing are arranged inside the tire shaft;

the tire shaft is configured to couple the drive wheel and the transmission member to each other;

the first planetary gear and the second planetary gear are helical gears with opposite helix angles;

the first planetary gear and the second planetary gear have a first helix angle and a second helix angle, respectively, which satisfy $\beta_2 = \tan^{-1}\{(P_1/P_2) \cdot \tan(\beta_1)\}$;

$\beta_1$ represents the first helix angle of the first planetary gear;

$P_1$ represents a first tangential force produced in accordance with the first helix angle;

$\beta_2$ represents the second helix angle of the second planetary gear; and $P_2$ represents a second tangential force produced in accordance with the second helix angle.

2. The drive device according to claim 1, further comprising a supporting member that is disposed on an outer circumferential surface of the axle housing and supports the tire shaft.

3. The drive device according to claim 1, wherein the transmission member and the tire shaft are splined to each other.

4. The drive device according to claim 1, wherein:

the reduction gear housing comprises a first housing portion fixed to the axle housing and a second housing portion fixed to the axle housing;

the second housing portion fixes the fixed ring gear; and the first housing portion and the second housing portion are splined to each other.

5. The drive device according to claim 1, wherein a rotation shaft of the motor and the sun gear are splined to each other.

6. The drive device for according to claim 1, further comprising a spacer between the axle housing and the reduction gear housing, wherein the axle housing and the reduction gear housing are coupled to each other via the spacer.

7. An electric vehicle comprising:
a drive wheel; and
the drive device according to claim 1.

8. A drive device for an electric vehicle, the drive device comprising:
a motor configured to be installed at a position adjacent to a drive wheel of the electric vehicle;
a reduction gear configured to reduce rotational speed of the motor and transmit resultant rotation to the drive wheel; and
a reduction gear housing that accommodates the reduction gear,
the reduction gear comprising:
a sun gear configured to be driven by the motor;
a first planetary gear that is configured to be meshed with the sun gear and has a first number of teeth;
a fixed ring gear that is meshed with the first planetary gear and arranged non-rotatably;
a second planetary gear that is coupled to the first planetary gear and has a second number of teeth that is smaller than the first number of teeth;
a movable ring gear that is meshed with the second planetary gear and arranged rotatably; and
a transmission member configured to transmit rotation of the movable ring gear to the drive wheel,
wherein:
the motor is configured to be further toward a center side of the electric vehicle than a disk portion of a wheel of the drive wheel;
the reduction gear housing is configured to be between motor and the disk portion;
the first planetary gear and the second planetary gear are helical gears with opposite helix angles;
the first planetary gear and the second planetary gear have a first helix angle and a second helix angle, respectively, which satisfy $\beta_2 = \tan^{-1}\{(P_1/P_2)\cdot\tan(\beta_1)\}$;
$\beta_1$ represents the first helix angle of the first planetary gear;
$P_1$ represents a first tangential force produced in accordance with the first helix angle;
$\beta_2$ represents the second helix angle of the second planetary gear; and
$P_2$ represents a second tangential force produced in accordance with the second helix angle.

9. The drive device according to claim 8, further comprising:
a tire shaft having a tubular shape and being configured to couple the drive wheel and the transmission member to each other; and
a bearing inside the tire shaft,
wherein:
the transmission member comprises an axle portion including: (i) a first shaft portion having a rod shape; and iii) a second shaft portion coupled to each of an end portion of the first shaft portion and the tire shaft;
the reduction gear housing comprises a bearing support portion having a tubular shape that extends inside the tire shaft; and
the bearing is on an outer circumferential surface of the bearing support portion and rotatably supports the first shaft portion.

10. An electric vehicle comprising:
a drive wheel; and
the drive device according to claim 8.

11. A drive device for an electric vehicle, the drive device comprising:
a motor configured to be installed at a position adjacent to a drive wheel of the electric vehicle;
a reduction gear configured to reduce rotational speed of the motor and transmit resultant rotation to the drive wheel;
an axle housing that accommodates the motor;
a reduction gear housing that accommodates the reduction gear and is coupled to the axle housing; and
a tire shaft having a tubular shape and being configured to couple the drive wheel and the reduction gear to each other,
the reduction gear comprising:
a sun gear configured to be driven by the motor;
a first planetary gear that is configured to be meshed with the sun gear and has a first number of teeth;
a fixed ring gear that is meshed with the first planetary gear and arranged non-rotatably;
a second planetary gear that is coupled to the first planetary gear and has a second number of teeth that is smaller than the first number of teeth;
a movable ring gear that is meshed with the second planetary gear and arranged rotatably;
a transmission member configured to transmit rotation of the movable ring gear to the drive wheel;
a plurality of composite planetary gears, each of which includes the first planetary gear and the second planetary gear coupled to each other;
a carrier member that defines an interval between the plurality of composite planetary gears arranged around the sun gear, the carrier member including:
a plurality of shaft portions extending along rotation shafts of the plurality of composite planetary gears, respectively;
a plate-shaped first coupling portion to which a first end portion of each of the plurality of shaft portions is coupled; and
a plate-shaped second coupling portion to which a second end portion of each of the plurality of shaft portions is coupled; and
a plurality of bearings rotatably supporting the plurality of shaft portions, respectively,
wherein:
an oil path is defined inside each of the plurality of shaft portions for guiding lubricating oil to the bearing supporting the shaft portion from an oil supply port defined in the first end portion or the second end portion of the shaft portion; and
at least one of the transmission member or the reduction gear housing has a nozzle portion at a position facing the oil supply port and configured to inject the lubricating oil toward the oil supply port.

12. The drive device according to claim 11, wherein a surface of at least one of the plate-shaped first coupling portion or the plate-shaped second coupling portion facing the nozzle portion is defined with part of an oil groove having an annular shape that passes through the oil supply port of each of the plurality of shaft portions.

13. A drive device for an electric vehicle, the drive device comprising:
a motor configured to be installed at a position adjacent to a drive wheel of the electric vehicle;
a reduction gear configured to reduce rotational speed of the motor and transmit resultant rotation to the drive wheel; and
a reduction gear housing that accommodates the reduction gear, the reduction gear comprising:
  a sun gear configured to be driven by the motor;
  a first planetary gear that is configured to be meshed with the sun gear and has a first number of teeth;
  a fixed ring gear that is meshed with the first planetary gear and arranged non-rotatably;
  a second planetary gear that is coupled to the first planetary gear and has a second number of teeth that is smaller than the first number of teeth;
  a movable ring gear that is meshed with the second planetary gear and arranged rotatably;
  a transmission member configured to transmit rotation of the movable ring gear to the drive wheel;
  a plurality of composite planetary gears, each of which includes the first planetary gear and the second planetary gear coupled to each other;
  a carrier member that defines an interval between the plurality of composite planetary gears arranged around the sun gear, the carrier member including:
    a plurality of shaft portions extending along rotation shafts of the plurality of composite planetary gears, respectively;
    a plate-shaped first coupling portion to which a first end portion of each of the plurality of shaft portions is coupled; and
    a plate-shaped second coupling portion to which a second end portion of each of the plurality of shaft portions is coupled; and
  a plurality of bearings rotatably supporting the plurality of shaft portions, respectively,
wherein:
  the motor is configured to be further toward a center side of the electric vehicle than a disk portion of a wheel of the drive wheel;
  the reduction gear housing is configured to be between motor and the disk portion;
  an oil path is defined inside each of the plurality of shaft portions for guiding lubricating oil to the bearing supporting the shaft portion from an oil supply port defined in the first end portion or the second end portion of the shaft portion; and
  at least one of the transmission member or the reduction gear housing has a nozzle portion at a position facing the oil supply port and configured to inject the lubricating oil toward the oil supply port.

14. The drive device according to claim 13, wherein a surface of at least one of the plate-shaped first coupling portion or the plate-shaped second coupling portion facing the nozzle portion is defined with part of an oil groove having an annular shape that passes through the oil supply port of each of the plurality of shaft portions.

* * * * *